US007819742B2

(12) United States Patent
Chamberlain et al.

(10) Patent No.: US 7,819,742 B2
(45) Date of Patent: Oct. 26, 2010

(54) GAMING DEVICE HAVING AN ELECTRONIC FUNDS TRANSFER SYSTEM

(75) Inventors: John W. Chamberlain, Carson City, NV (US); Mohamad Ali Saffari, Reno, NV (US); Larry R. Hollibaugh, Reno, NV (US)

(73) Assignee: IGT, Reno, NV (US)

( * ) Notice: Subject to any disclaimer, the term of this patent is extended or adjusted under 35 U.S.C. 154(b) by 1258 days.

(21) Appl. No.: 10/662,618

(22) Filed: Sep. 15, 2003

(65) Prior Publication Data

US 2004/0087360 A1 May 6, 2004

Related U.S. Application Data

(63) Continuation-in-part of application No. 10/229,772, filed on Aug. 28, 2002, now Pat. No. 7,749,079.

(51) Int. Cl.
*A63F 13/00* (2006.01)
(52) U.S. Cl. .............................. 463/25; 463/16; 463/20; 463/29; 463/40; 463/42
(58) Field of Classification Search ..................... 463/1, 463/12, 13, 16–20, 25–30, 40–42; 273/292, 273/293, 138.2, 139, 143 R, 138; 235/375, 235/380, 381, 379; 705/16–18, 35, 39, 41–45; 902/23
See application file for complete search history.

(56) References Cited

U.S. PATENT DOCUMENTS 4,575,622 A * 3/1986 Pellegrini ..................... 463/25

| 4,764,666 A | 8/1988 | Bergeron |
| 4,882,473 A | 11/1989 | Bergeron et al. |
| 5,038,022 A | 8/1991 | Lucero |
| 5,265,874 A | 11/1993 | Dickinson et al. |

(Continued)

FOREIGN PATENT DOCUMENTS

EP 0 805 424 A2 11/1997

(Continued)

OTHER PUBLICATIONS

World Gaming News (website) written by WGNews@worldgaminglive.com, printed Oct. 17, 2001.

(Continued)

*Primary Examiner*—James S. McClellan
*Assistant Examiner*—Sunit Pandya
(74) *Attorney, Agent, or Firm*—K&L Gates LLP

(57) ABSTRACT

A system, method and gaming device having a card reader and a receipt printer are provided. One processor of the gaming device communicates with a receipt printer and plays a game program. Another processor operates as part of an electronic funds transfer control unit that communicates with a card reader, keypad and display for prompting the player to enter fund transfer card information. The control unit sends out fund requests over a wide area network to a remote fund repository. If the repository approves of a fund request, the approval travels back to the ticket validation system, which instructs the gaming device to: (i) issue a direct transfer of funds via the credit meter, a hopper or a lottery and (ii) issue a receipt for the transfer to the player.

27 Claims, 11 Drawing Sheets

U.S. PATENT DOCUMENTS

| | | | |
|---|---|---|---|
| 5,276,312 A | 1/1994 | McCarthy | |
| 5,290,033 A | 3/1994 | Bittner et al. | |
| 5,326,104 A | 7/1994 | Pease et al. | |
| 5,332,076 A | 7/1994 | Ziegert | |
| 5,342,047 A | 8/1994 | Heidel et al. | |
| 5,344,144 A | 9/1994 | Cannon | |
| 5,371,345 A | 12/1994 | LeStrange et al. | |
| 5,397,125 A | 3/1995 | Adams | |
| 5,398,932 A | 3/1995 | Eberhardt et al. | |
| 5,429,361 A | 7/1995 | Raven et al. | |
| 5,457,306 A * | 10/1995 | Lucero | 235/380 |
| 5,470,079 A | 11/1995 | LeStrange et al. | |
| 5,505,449 A | 4/1996 | Eberhardt et al. | |
| 5,557,086 A | 9/1996 | Schulze et al. | |
| 5,559,312 A * | 9/1996 | Lucero | 463/25 |
| 5,580,309 A | 12/1996 | Piechowiak et al. | |
| 5,580,310 A | 12/1996 | Orus et al. | |
| 5,611,730 A | 3/1997 | Weiss | |
| 5,645,486 A | 7/1997 | Nagao et al. | |
| 5,709,603 A | 1/1998 | Kaye | |
| 5,761,647 A | 6/1998 | Boushy | |
| 5,766,074 A | 6/1998 | Cannon et al. | |
| 5,811,772 A * | 9/1998 | Lucero | 235/380 |
| 5,902,983 A * | 5/1999 | Crevelt et al. | 235/380 |
| 5,919,091 A | 7/1999 | Bell et al. | |
| 5,935,000 A | 8/1999 | Sanchez, III et al. | |
| 5,952,640 A * | 9/1999 | Lucero | 235/380 |
| 5,959,277 A * | 9/1999 | Lucero | 235/380 |
| 6,014,594 A | 1/2000 | Heidel et al. | |
| 6,019,283 A | 2/2000 | Lucero | |
| 6,039,648 A | 3/2000 | Guinn et al. | |
| 6,048,269 A * | 4/2000 | Burns et al. | 463/25 |
| 6,056,642 A | 5/2000 | Bennett | |
| 6,104,815 A | 8/2000 | Alcorn et al. | |
| 6,113,098 A | 9/2000 | Adams | |
| 6,125,307 A | 9/2000 | Heidel et al. | |
| 6,128,550 A | 10/2000 | Heidel et al. | |
| 6,139,419 A | 10/2000 | Abe | |
| 6,190,256 B1 | 2/2001 | Walker et al. | |
| 6,244,958 B1 | 6/2001 | Acres | |
| 6,247,643 B1 | 6/2001 | Lucero | |
| 6,270,410 B1 * | 8/2001 | DeMar et al. | 463/20 |
| D451,153 S | 11/2001 | Hedrick et al. | |
| 6,318,536 B1 | 11/2001 | Korman et al. | |
| 6,347,738 B1 | 2/2002 | Crevelt et al. | |
| 6,394,907 B1 | 5/2002 | Rowe | |
| 6,488,203 B1 | 12/2002 | Stoutenberg et al. | |
| 6,547,131 B1 * | 4/2003 | Foodman et al. | 235/380 |
| 6,558,256 B1 | 5/2003 | Saunders et al. | |
| 6,579,179 B2 | 6/2003 | Poole et al. | |
| 6,585,598 B2 * | 7/2003 | Nguyen et al. | 463/41 |
| 6,648,755 B1 * | 11/2003 | Luciano et al. | 463/17 |
| 6,676,522 B2 * | 1/2004 | Rowe et al. | 463/42 |
| 6,682,421 B1 | 1/2004 | Rowe et al. | |
| 6,729,958 B2 | 5/2004 | Burns et al. | |
| 6,736,725 B2 | 5/2004 | Burns et al. | |
| 6,743,098 B2 | 6/2004 | Urie et al. | |
| 6,752,312 B1 | 6/2004 | Chamberlain et al. | |
| 6,814,282 B2 | 11/2004 | Seifert et al. | |
| 6,834,794 B2 | 12/2004 | Dabrowski | |
| 6,852,029 B2 | 2/2005 | Baltz et al. | |
| 2002/0002075 A1 | 1/2002 | Rowe | |
| 2002/0077178 A1 | 6/2002 | Oberberger et al. | |
| 2002/0103027 A1 | 8/2002 | Rowe et al. | |
| 2002/0169021 A1 | 11/2002 | Urie et al. | |
| 2003/0032474 A1 | 2/2003 | Kaminkow | |
| 2003/0172083 A1 | 9/2003 | Goodwin et al. | |
| 2004/0033095 A1 | 2/2004 | Saffari et al. | |
| 2004/0039702 A1 | 2/2004 | Blair et al. | |
| 2004/0204233 A1 | 10/2004 | Saffari et al. | |
| 2005/0017067 A1 | 1/2005 | Seifert et al. | |

FOREIGN PATENT DOCUMENTS

| | | |
|---|---|---|
| RU | 95103479 | 3/1995 |
| RU | 2161821 C2 | 7/2008 |
| WO | WO 02/22223 | 3/2002 |

OTHER PUBLICATIONS

European Search Report for Application No. EP 04 78 3905 dated Dec. 7, 2009.

* cited by examiner

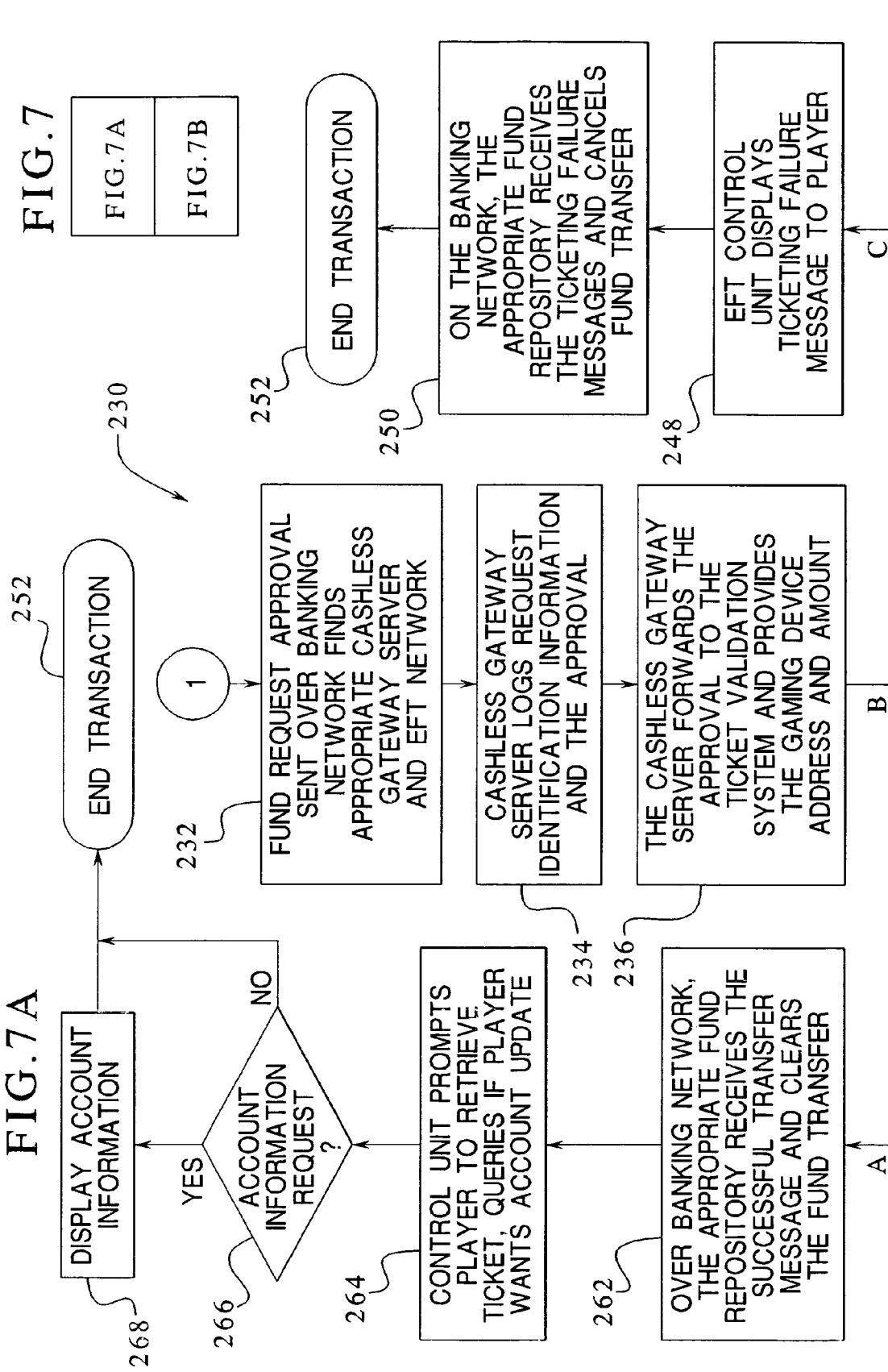

GAMING DEVICE HAVING AN ELECTRONIC FUNDS TRANSFER SYSTEM

PRIORITY CLAIM

The present invention is a continuation-in-part of U.S. patent application Ser. No. 10/229,772, filed Aug. 28, 2002 now U.S. Pat. No. 7,749,079, entitled "GAMING DEVICE HAVING AN ELECTRONIC FUNDS TRANSFER SYSTEM".

CROSS REFERENCE TO RELATED APPLICATIONS

The present invention relates to the following co-pending commonly owned U.S. Patent applications: "ELECTRONIC FUND TRANSFER KIOSK FOR USE WITH WAGERING GAMING MACHINE," Ser. No. 10/662,495, "METHOD AND APPARATUS FOR TICKET GENERATION AND ACCOUNTING," Ser. No. 09/688,777.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device system and method for enabling players to access money using a credit card or a debit card.

BACKGROUND OF THE INVENTION

It is well known to provide a gaming device that accepts money from a player, holds the money while the player plays the gaming device and enables the player to retrieve the player's money at any time. Known gaming devices thus do not require the player to input a wagerable amount of money in the gaming device each time the player wishes to play a game. When the player wins while playing known gaming devices, the gaming devices do not require the player to immediately take the winnings if the player desires to continue play. Known gaming devices therefore provide a mechanism by which the player can input and maintain a pool of money (i.e., credits) in the gaming device to play many games of the gaming device. The gaming machine can also accumulate and store the player's winnings. When the player wishes to stop playing, known gaming devices preferably provide a mechanism by which the player can retrieve the money that remains in the pool.

It is also known that slot machines may accept wagers in different forms such as coins, tokens, paper currency and tickets. Gaming devices that utilize credit cards and debit cards to transfer funds to a slot machine have also been proposed. Such known systems generally enable the player to receive funds using a standard credit, debit or other card at the gaming device and immediately use the funds to play the game. That is, the electronic funds are transferred directly to the game rather than to the player.

One problem facing electronic funds transfer systems is their security. Many regulatory agencies will not approve electronic funds transfers primarily because the proposed systems do not confirm a transfer. That is, there is no lasting evidence that a transfer has occurred. A system needs to provide such evidence, so that electronic funds transfers can occur in a more secure fashion.

Further, a casino having a remote fund transfer system would have dual revenue streams from a single machine, i.e., the amount inputted at the machine plus intermittent, e.g., daily, payments by the credit issuers. The casino would therefore require that the game account for how much credit it issued to players over the same period. Otherwise, the casino would have no way of determining the profitability of a particular machine. Each machine would therefore be required to have the capability to store and transfer a record of the amount of each cashless crediting of the machine. The casino would most likely want to know the date and time of each transaction, as well as other player specific information.

Still further, in known systems, because the transfer of money to game play is seamless, the gaming device is required to have the ability to send and receive authorization information, realize an amount of money that has been transferred, convert the money amount into a game credit amount, add or subtract an amount of credits that the player thereafter wins or loses and issue an appropriate cash out when the player desires. Accordingly, the game's processor handles the normal game accounting in combination with the electronic funds transfer accounting.

It is also known to provide ticket systems for gaming machines, wherein the gaming machines issue and accept tickets in lieu of money. Such systems provide a workable cashless system on a local or casino level. The casino operator redeems an amount of money imprinted on the ticket through visual inspection or via a ticket validation system. Ticketing systems are advantageous because they reduce the amount of cash transactions and the need for the player to transport and hold large amounts of cash or coins. Consequently, ticketing systems have become common in certain gaming jurisdictions, such as is Oregon, Minnesota, Mississippi and Nevada. Various manufacturers produce these types of ticketing systems including the assignee of the present application. These systems require each machine to have a ticket printer.

The role of ticketing machines has recently been expanded to enable a player to redeem the ticket at a gaming device. As before, the ticketing system issues a cash out ticket in response to a player's cash out request. In the expanded role, the cash out ticket includes information that enables the player to present the ticket to a cashier, as before, or to re-insert the ticket into a gaming device configured to accept ticket transactions.

In this expanded role, the ticket accepting gaming devices must now contain a ticket reader as well as the ticket printer. In the expanded system, the cash out ticket typically contains a barcode, a written ticket amount, the time and date of printing, a numerical representation of the barcode and other identification and validation information. To redeem the ticket for its value, the player either presents the ticket to the operator, who validates the ticket and pays the player an amount of money, or the player inserts the ticket into a ticket-ready gaming device, whereby the gaming device provides the player with a number of credits equal to the amount represented by or encoded on the ticket.

The controllers of the ticket-ready gaming devices are adapted to coordinate with the ticket validation system. For example, when a cash out ticket is inserted into a ticket reader equipped in a gaming device, the ticket reader forwards information, which can be stored on a barcode, to the game's controller. The game controller recognizes this information as ticket information and forwards the ticket information to a ticket validation system outside the gaming device. The ticket validation system analyzes the ticket information, and if the ticket is valid, the ticket validation system provides the game controller with an authorization to credit the gaming machine with the amount represented by or encoded on the ticket.

Alternatively, if the ticket validation system detects that the ticket is not valid, the ticket validation system instructs the game controller to reject the ticket. The ticket validation system may also log the failed attempt in a statistical database that will record the information for future reference. Manufacturers employing this method of ticket operation include International Game Technology (Reno, Nev.), Bally Systems (Sparks, Nev.), Casino Data Systems (Las Vegas, Nev.) as well as others.

Ticketing benefits each player, not just those wishing to access remote funds from the game. Gaming establishments have also become familiar with the ticketing systems and their proven performance. Ticketing systems are therefore likely to proliferate within the gaming industry. Accordingly, a need exists to provide an electronic funds transfer system that utilizes the ticketing system's hardware and software as much as possible to avoid duplication of such hardware and software in accounting for the transfer of the electronic funds.

A need also exists to make a secure electronic funds transfer system. A further need exists to provide evidence of the electronic transaction. A still further need exists to provide an electronic funds transfer system designed to place the funds in the player's hands rather than directly in the credit meter of the gaming device.

SUMMARY OF THE INVENTION

The present invention provides an apparatus, a system and a method for electronically transferring funds at a gaming device. The apparatus includes a gaming device having a ticketing system including a ticket reader and a ticket printer. The processor of the gaming device (or alternatively a separate processor in or associated with the gaming device) communicates with each of these devices as well as a ticket validation system, which is preferably located within the casino or gaming establishment and outside of the gaming device.

The ticket validation system is connected to or in communication with a ticket validation network. The ticket validation system includes a ticket validation server and operator interfaces to enable the operators to redeem tickets as well as to monitor ticketing transactions. The ticket validation network enables a plurality of gaming device processors in the same casino or gaming establishment to communicate with the same ticket validation system.

The ticket reader uses software for reading the barcode of a ticket, and after reading the barcode, the ticket reader passes the barcode information to the processor of the gaming device. The gaming device then forwards the barcode information to the ticket validation system via the ticket validation network to verify its authenticity. After verifying the authenticity, the ticket validation system presents an authorization to the gaming device for the ticket amount, via the ticket validation network, and the gaming device in turn adds credits to its credit meter in the amount authorized by the ticket validation system. Finally, the gaming device instructs the ticket reader to retain the used ticket internally so that it is not returned to the presenter.

The ticket validation network is thus preferably a local area network. This local area network, in turn, is connected to or is in communication with a cashless gateway server that validates electronic funds transfer requests. The gaming devices are also equipped with electronic funds transfer control units that control a card reader, a keypad and a display for enabling a player to enter the player's account number, transaction type (i.e., credit or debit), desired transfer amount and personal identification number (PIN). The display prompts the player for such information and informs the player of fund request approvals and rejections.

The electronic funds transfer control units send out requests over a separate local area network known as the electronic funds transfer ("EFT") network, which connects all such devices to a cashless gateway server. The cashless gateway server, in turn, connects via a wide area network (banking network), to a remote fund repository associated with or responsible for maintaining the player's credit or debit account. The banking network therefore includes at least one and preferably a plurality of remote fund repositories and at least one and preferably a plurality of cashless gateway servers.

The banking network includes a cashless gateway server, which serves as a switching station for a plurality of EFT control units in the gaming devices from one or more casinos or gaming establishments. The electronic funds transfer network is adaptable to be a local area network, similar to the ticket validation network when it serves only one casino. The electronic funds transfer network is alternatively a wide area network that serves a plurality of casinos or gaming establishments. The cashless gateway server employs suitable switching software that receives a fund transfer request from an electronic funds transfer network and relays the message out over the wide area banking network. The appropriate remote fund repository receives the request and analyzes it.

The electronic funds transfer network also communicates with the ticket validation system of the local area ticket validation network. The cashless gateway server and the ticket validation system, which are operatively connected, facilitate the communication between the electronic funds transfer network and the ticket validation system. This communication link provides the link between the electric fund transfer control unit of the gaming device and the processor of the gaming device. Although close in physical proximity, the EFT control unit and game processor communicate through the various networks and do not contain a direct link in one preferred embodiment.

In an alternative embodiment, the gaming machine is still connected to the ticket validation network for the purpose of issuing and redeeming tickets, and the cashless gateway provides its own network to communicate to each gaming device. This arrangement provides flexibility to both the manufacturer of the ticket validation network, and the manufacturer of the cashless gateway. In this arrangement neither manufacturer is dependant on the other to process each piece of the transaction.

The remote fund repository is a bank or credit union that analyzes each request according to standard banking procedures. In one embodiment, the bank verifies that the account is active, verifies a personal identification number, verifies that an amount requested is at or below an amount limit and/or verifies that an amount requested is within the available amount currently residing in or available through the account. If the request meets each of these criteria, the remote fund repository returns a request approval over the banking network. If the request does not meet any one of the criteria, the remote fund repository returns a request rejection over the banking network.

The cashless gateway server for the appropriate electronic funds transfer network receives the fund request approval or rejection and forwards the request on to the electronic funds transfer control unit of the appropriate gaming device. If the request is rejected, the electronic funds transfer control unit provides the player with an opportunity to view account information and submit another fund request at a lesser amount. If the request is approved, the control unit provides the player with a suitable message to remove a credited ticket and an associated receipt for the transaction. Also, if the request is approved, the electronic funds transfer network forwards the approval to the ticket validation system of the ticket validation network. The ticket validation system instructs the game processor of the appropriate gaming device to issue a credited ticket and an accompanying receipt to the player for the requested amount.

The method of the present invention enables the player to enter the required fund request information, which preferably includes the account number and the transfer amount. The request is analyzed as discussed herein and, if approved, the player receives a cash equivalent ticket in the amount of the requested transfer. The cash equivalent ticket is redeemable for cash through an operator or for credits from a gaming device that has a ticket reader. The present invention therefore provides time for the player or user to confirm the player's decision to withdraw the money. The player can choose to not spend the money, to wager the money or to spend it in a non-gaming fashion.

The player can also remove money from their debit or credit card accounts on one machine with the idea of playing the money at another machine. This enables machines that accept tickets, but not credit and debit cards, to accept funds from a credit or debit card transaction. Further, by incorporating the printer that already exists in a ticketing machine into the present invention, the cost of a separate printer is eliminated. Having one printer instead of two (one for ticket and one for credit or debit card receipt) reduces the number of printer rolls that the gaming establishments have to stock and reload. The same printer or a separate printer may also be used to issue a receipt to the player. Even if, for security reasons, a separate printer for a receipt is desirable, the present invention makes use of an existing printer to print a cash equivalent ticket for the player.

In one alternative embodiment, the gaming device pays the player with cash or money instead of crediting a ticket and issuing a ticket to the player. The gaming device in one embodiment increments the credit meter of the gaming device by the amount selected by the player, i.e., converts the EFT directly into gaming device credits. Otherwise, the gaming device issues tokens into the hopper or credits a casino card or smart card. The gaming device can also provide for any combination of these payment types and enable the player to choose one or more types. For example, the player can request one hundred dollars while playing the gaming device and specify that fifty of the dollars be credited to the player's casino card, forty dollars worth to the game in credits and the remaining ten dollars in tokens. Partial payouts can also be provided on a ticket.

The present invention further alternatively includes providing, either alone, in combination with any one or more or the cash payments described in the previous paragraph and/or a ticket payment, with the provision of one or more lottery ticket. In one embodiment, the EFT network or the banking network is linked with the state lottery, a multi-state lottery or any other type of lottery game. In one embodiment, a ticket or receipt printer is provided that issues a scratch-off-type lottery ticket. Otherwise, one or more lottery ticket could be Keno-type or any other state or multi-state lottery ticket, such as a Powerball™ ticket.

The gaming device, regardless of the type of monetary payout, issues a receipt to the player for the amount of the EFT. The gaming device can use a display to show the player that the EFT has been completed; however, the gaming device preferably provides the player with a hard copy receipt confirming the transaction and showing the amount of the EFT. The receipt can also provide other information transmitted via the EFT, such as the date, time and location of the transaction, as well as the account from which the funds have been withdrawn and the funds remaining in the account. The present invention also includes enabling the player to choose between a cash payment and a ticket pay, wherein the receipt printer doubles as a ticket printer, or wherein a second ticket printer is provided.

It is therefore an advantage of the present invention to provide a gaming device having an EFT system that employs existing ticket system hardware.

Another advantage of the present invention is to provide a system for electronically transferring funds at a gaming device that incorporates secure ticketing and banking networks.

A further advantage of the present invention is to provide a method of electronically transferring funds to the player for subsequent gaming or non-gaming uses.

Yet another advantage of the present invention is to provide a receipt to the player, so that the player has a record or evidence of the electronic fund transaction.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronic Configuration

Figure 1:
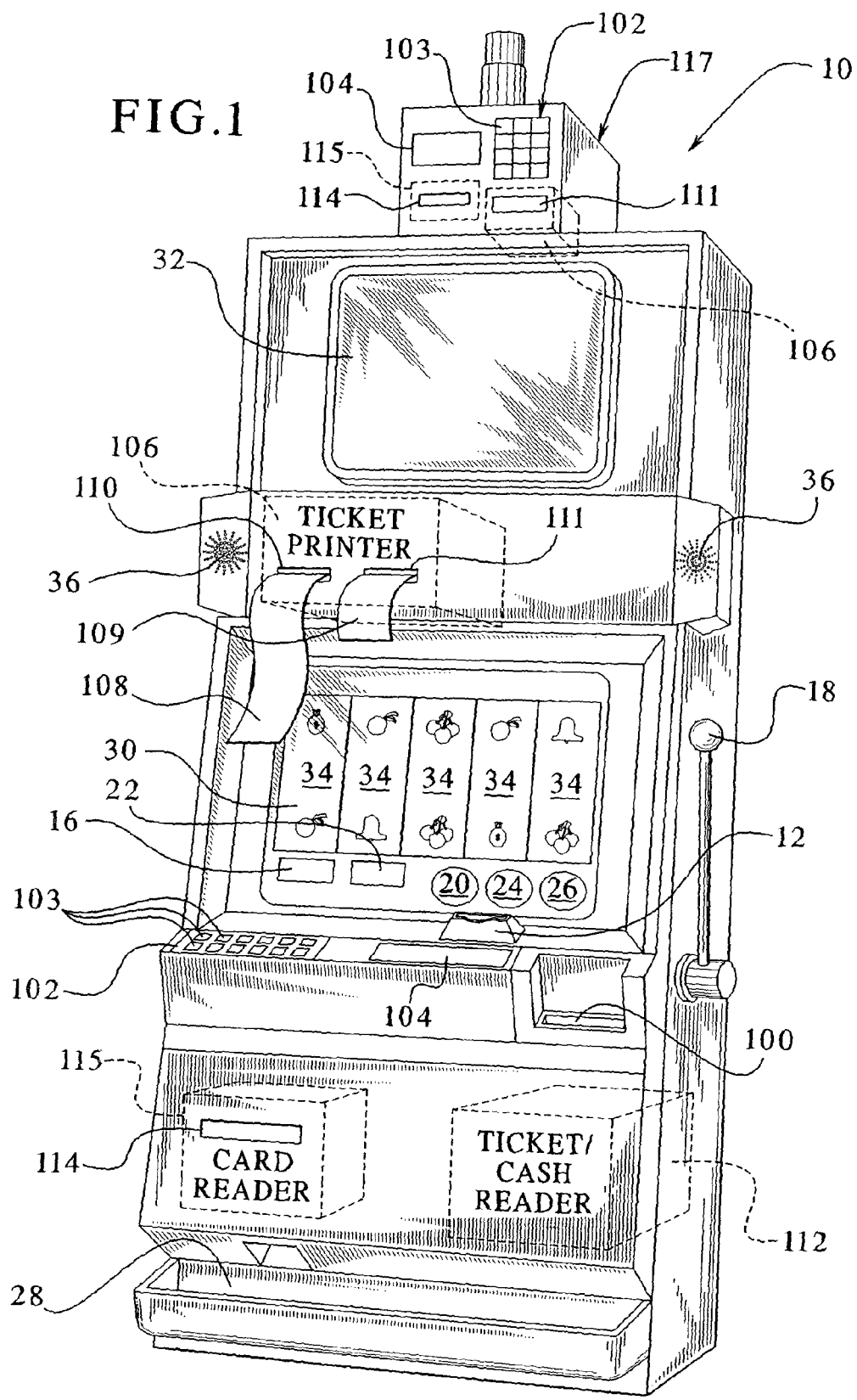
FIG. 1 is a perspective view of one embodiment of a gaming device having the electronic funds transfer system of the present invention.

Referring now to the drawings and in particular to FIG. 1, the present invention provides a system for players of gaming devices to access funds directly from a gaming device 10. The present invention includes the gaming device 10 having any primary or base game and optionally a secondary or bonus game. In one preferred embodiment, as illustrated in FIG. 1, the gaming device 10 is a slot machine having the controls, displays and features of a conventional slot machine, wherein the player operates the gaming device while standing or sitting. Gaming device 10 may be adapted to be a slant-top type of gaming device (not shown) or, further alternatively, a pub-style or table-top game (not shown), which a player operates while sitting.

Besides slot, the primary game of the gaming device 10 may include poker, blackjack, keno or any other game. The gaming device 10 is also adaptable to provide any type of bonus triggering event, bonus game or progressive game. The symbols and indicia used for any of the base, bonus and progressive games include mechanical or video symbols and indicia.

The gaming device 10 includes monetary input devices. FIG. 1 illustrates a coin slot 12 for accepting coins or tokens and a ticket/bill acceptor 100 for accepting bills or paper currency. The ticket/bill acceptor 100 also accepts tickets 108 as discussed below. Aperture 114 is defined by a card reader 115 (shown in phantom) that resides within the gaming device 10. The player may insert or swipe a debit card, credit card, smart card or other banking card into aperture 114, which can be configured for either movement in a conventional manner. The gaming device 10 also includes a conventional numerical multi-button keypad 102 that enables the player to enter credit card or debit card information into the gaming device as described in detail below. The card reader 115 and keypad 102 operate in conjunction with a funds transfer display 104. Gaming device 10 also includes a ticket/ receipt printer 106 (shown in phantom) mounted, in one embodiment, inside the gaming device 10, which issues tickets 108 through an aperture 110 or any suitable secure ticket feeder (not shown).

In one preferred embodiment, the numerical keypad 102 includes buttons 103 representing the numbers zero through nine, an enter button, a cancel button, a select credit button and a select debit button. The keypad alternatively does not have the credit versus debit select capability. The funds transfer display 104 is preferably a vacuum florescent display that displays prompts for information, displays information entered by the player via the keypad 102 and displays messages delivered from a bank or credit provider.

The keypad 102 and the funds transfer display 104 may be mounted in any suitable location on the gaming device 10. Both the keypad 102 and the funds transfer display 104 are suitably privately placed and displayed on the gaming device 10, so that the player can securely and safely enter and receive credit and debit card information. Although not illustrated, gaming device 10 may be adapted to have suitable covers or blinders extending from the front panel and positioned to hide the player's actions. Alternatively, the gaming device 10 may be adapted such that one or both of the keypad 102 and funds transfer display 104 appear on one of the game display devices described below. Further alternatively, one or both the keypad 102 and the funds transfer display 104 are disposed inside a hand held unit (not shown), which connects to gaming device 10 via a suitable flexible cable (not shown). Alternatively, player identification information can be obtained from alternate means, some of which might not have been invented or made commercially available at this point in time. Some currently available player identification techniques include, but are not limited to fingerprint and retinal scan devices.

The ticket/receipt printer 106 preferably employs thermal printing technology, although the gaming device 10 may be adapted to use any form of printer such as impact type printers. Several vendors provide or are in the process of developing thermal printers. These vendors include: Seiko Instruments, Ithaca, and Japan Cash Machines. The present invention preferably employs thermal printing because thermal printers are faster than impact printers, thermal printers have fewer moving parts and thermal printers do not need a print ribbon which requires occasional servicing. Thermal printing uses a heated plate contained within the printer 106 to thermally activate ink imbedded in a durable paper-like media. It is important to note that while thermal printing technology currently is the state of the art in this type of document printing, this invention is not limited to thermal printing and may be adapted to employ other known or new printing types.

When a player inserts money into gaming device 10, a number of credits corresponding to the amount deposited is shown in a credit display 16. After depositing the appropriate amount of money, a player can begin the game by pulling arm 18, pushing play button 20 (or other suitable wager indicators such as the bet max button). Play button 20 can be any play activator used by the player which starts any game or sequence of events in the gaming device. The play button 20 as well as any input device described herein is adaptable to be a simulated area of a touch screen (described below) or an electromechanical, panel mount type, input device. The electromechanical input devices close a momentary or maintained contact switch that allows current to flow to an input of the game processor, whereby the processor activates a specific output.

As shown in FIG. 1, gaming device 10 also includes a simulated bet display 22 and a bet one credit button 24. In one embodiment, the player places a bet by pushing the bet one credit button 24. The player increases the bet by one credit each time the player pushes the bet one credit button 24. When the player pushes the bet one credit button 24, the number of credits shown in the credit display 16 decreases by one, and the number of credits shown in the bet display 22 increases by one.

At any time between games, a player may cash out by pushing a cash out button 26 to receive coins or tokens in the coin payout tray 28. The player alternatively cashes out and receives a ticket 108 from the ticket/receipt printer 106 through the aperture 110. One system for enabling the player to choose between a coin cash out and a ticket cash out, incorporated herein by reference, is disclosed in an application entitled, "Gaming Device Having a Cash Out Menu Screen and a System and Method for Enabling a Player to Retrieve Money From a Gaming Device," Ser. No. 09/819,175, by the assignee of the present invention.

The player can take the ticket 108 to a cashier or to another gaming device that accepts tickets. If a player wishes to use a ticket as payment to play the gaming device 10, the player inserts the ticket into the ticket reader 112 (shown in phantom) through ticket/bill acceptor 100. As described above, the ticket reader 112 sends barcode or other ticket information to the gaming device processor that forwards the information to the ticket validation system, which analyzes the ticket for validity. It should be appreciated that the ticket reader 112 in one embodiment reads both tickets and cash, such as one, five or ten dollar bills, etc. That is, ticket reader 112 can double as a bill validator. Therefore, in one embodiment, the ticket/bill acceptor 100 accepts both tickets 108 and cash. After accepting cash, the gaming device 10 converts the cash into game credits and displays the game credits on the credit display 16. For the purposes of this application, the ticket reader/bill validator is referred to as the ticket reader 112.

The embodiment of the gaming device 10 illustrated in FIG. 1 has a printer 106 and apertures 110 and 111. As described above, the aperture 110 allows the issuance of the ticket 108 bearing an amount of money from a cash out. As described below, the aperture 110 also allows the issuance of a ticket bearing an amount of money from an electronic funds transfer. When the player withdraws funds using a debit, credit, smart or similar banking card, the system of the present invention in one preferred embodiment also issues a receipt 109 as further discussed below.

In the illustrated embodiment, a single ticket/receipt printer 106 has two apertures. The second aperture 111 allows the issuance of the receipt 109, which shows various information such as: (i) account number, (ii) date of transaction; (iii) time of transaction; (iv) amount withdrawn; (v) amount available (in an account if debit and under a limit if credit or smart card); and (vi) a transaction reference number, etc. The player can save the receipt 109 and compare the receipt to a subsequently issued bank, credit card, smart card or similar banking card statement or check such transaction through a database network such the Internet.

The ticket/receipt printer 106 as illustrated can have separate paper rolls for the ticket 108 and the receipt 109, which in one embodiment requires that there be two apertures 110 and 111. From a logistical standpoint, the system does not preferably issue two items stacked one on top of the other. In another embodiment, a single perforated slip of paper having both the ticket 108 and receipt 109 information is issued from a single aperture. In a further embodiment, one wide aperture is employed to enable both the ticket 108 and receipt 109 to issue. Still further, gaming device 10 in an embodiment houses two separate printers, a ticket printer and a receipt printer, each having a single aperture. It may be desirous for economic and security reasons to have one secured ticket printer and one unsecured receipt printer.

Another alternative embodiment includes installing a separate EFT box 117 onto gaming device 10. The EFT box 117 may be adapted to include one or more of the keypad 102 and buttons 103, the funds transfer display 104, the card reader 115 and associated aperture 114, and a receipt printer 106 having an associated aperture 111. The externally mounted EFT box 117 may therefore replace the internally mounted card reader 115, the internally mounted keypad and fund transfer display 104 or operate in combination with one or both of them. To that end, gaming device 10 can include two card readers 115, one that operates with EFT box 117 and accepts the player's credit/debit card, and another that accepts the player's casino tracking card. Such an arrangement enables player's funds to be credited from the player's credit/card to the player's casino card for use, e.g., for gaming.

Besides the funds transfer display 104, the gaming device 10 also includes one or more display devices for playing its associated game. For instance, FIG. 1 illustrates a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism.

The display devices 30 and 32 are adaptable such that in one embodiment the central display device 30 is simulated and displays the main game, while the upper display device 32 is mechanical and displays a bonus game. In a video poker, blackjack or other card gaming machine embodiment, one of the display devices displays simulated cards. In a keno embodiment, one of the display devices displays simulated numbers. In a slot machine embodiment, one of the display devices displays a plurality of reels 34, in mechanical or video form. The gaming device 10 also preferably includes speakers 36 for making sounds or playing music.

Figure 2:
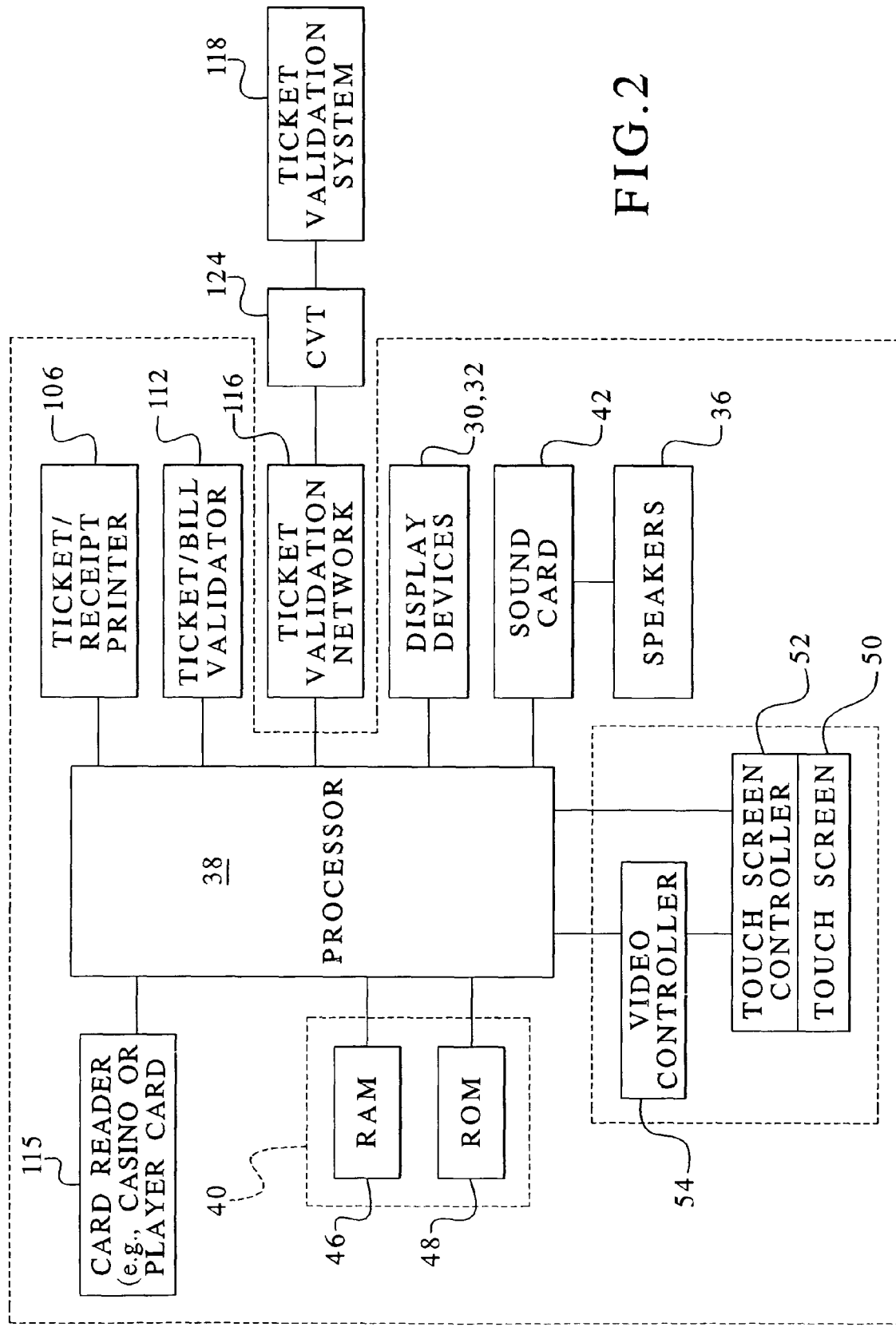
FIG. 2 is a schematic block diagram of the game control portion of the electronic configuration of one embodiment of a gaming device of the present invention.

Referring now to FIG. 2, a portion of the electronic configuration of one embodiment of gaming device 10 of the present invention, which is adapted to accept tickets as a form of payment, is illustrated.

Figure 4:
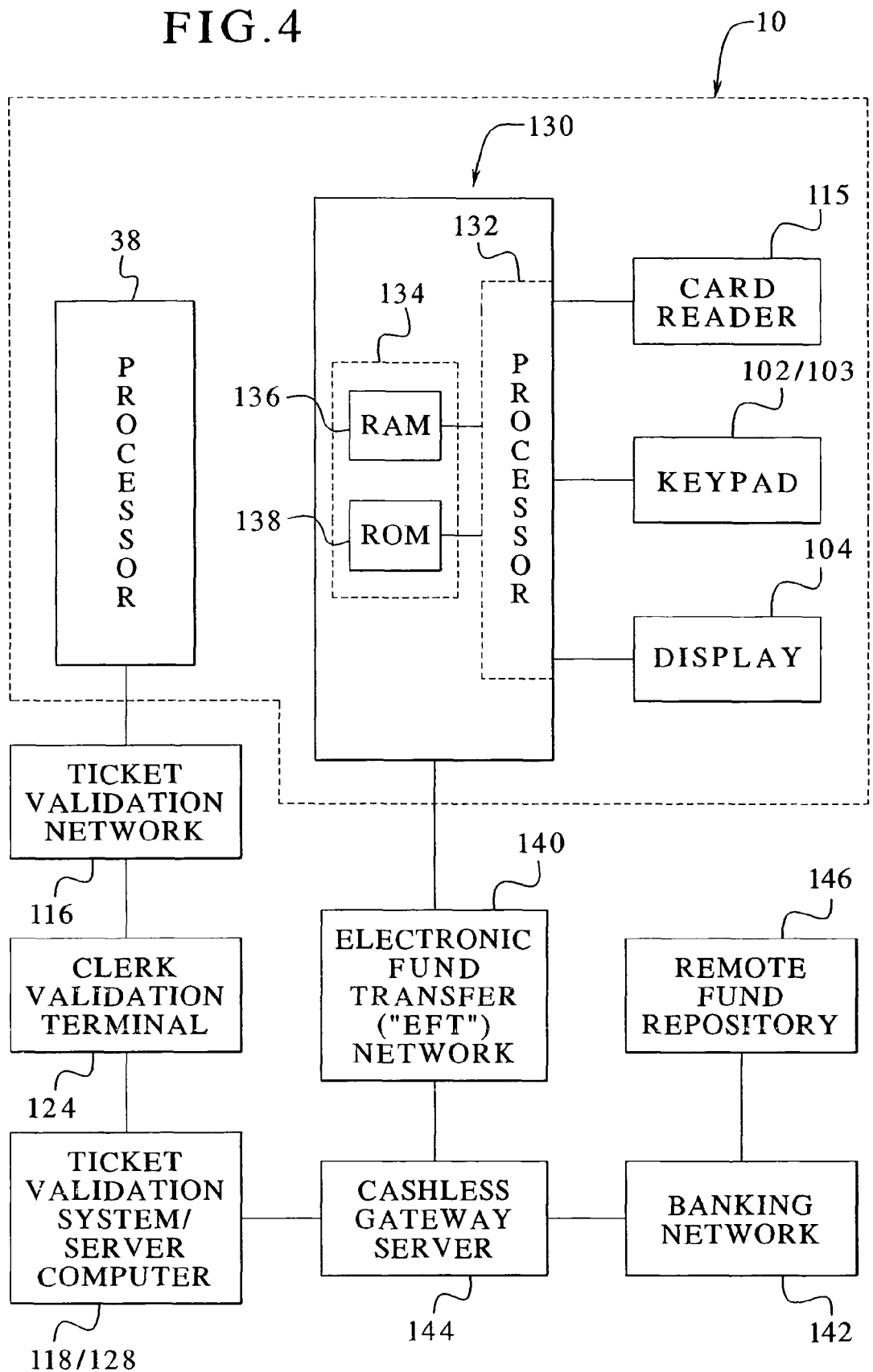
FIG. 4 is a schematic block diagram of the electronic configuration of one embodiment of the electronic funds transfer control unit of the present invention, which shows the game processor for illustration and reference.

The remainder of the major electronic components of gaming device 10 is shown in FIG. 4. FIG. 2 concentrates on the game processor 38 and the ticketing system of gaming device 10, while FIG. 4 concentrates on the EFT control. Game processor 38 is shown in both FIGS. 2 and 4, however, for reference.

Gaming device 10 as illustrated includes a processor 38 and a memory device 40. The processor 38 is preferably a microprocessor or microcontroller-based platform which is capable of causing the display device to display images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

It should be appreciated that although the gaming device 10 preferably includes the processor 38 and memory device 40, the gaming device 10 may be adapted to be implemented via one or more application-specific integrated circuits (ASIC's), one or more hard-wired devices, or one or more mechanical devices. Furthermore, although each gaming device of the present invention preferably includes its own processor 38 and memory device 40, the system of the present invention may be adapted to provide some or all of their functions at a central location such as a network server for communication to a playing station, such as over a local area network ("LAN"), wide area network ("WAN"), Internet connection, microwave link, and the like.

The processor 38 and memory device 40 control the central and upper display devices 30 and 32. The processor communicates with a sound card 42, which outputs to the speakers 36. A touch screen 50 and touch screen controller 52 are connected to a video controller 54 and the processor 38. As stated above in connection with FIG. 1, game functions historically inputted by the electromechanical pull arm 18, play button 20, the bet one button 24 and the cash out button 26 may be performed via the touch screen 50. The touch screen 50 enables a player to input decisions into the gaming device 10 by sending a discrete signal based on the area of the touch screen 50 that the player touches or presses.

The processor 38 of the gaming device 10 also communicates with the ticket/receipt printer 106 and the ticket reader 112. In one embodiment, the gaming device 10 communicates with the ticket/receipt printer 106 and the ticket reader 112 using an RS-485 or similar multi-drop protocol. In one embodiment, the gaming device 10 employs a protocol referred to as Netplex developed by the assignee of the present application. Netplex is generally an RS-485 compatible protocol that is used to interface peripherals such as printers, bill validators, ticket readers (if separate from the bill validation) as well as the touch screens.

The processor 38 of the gaming device 10 further communicates with a ticket validation network 116 in a conventional client/server manner. The ticket validation network 116 is a local area network or LAN. In one embodiment, the ticket validation network 116 is a fiber-optic network, which includes a fiber-optic line that runs from the processor 38 of each gaming device 10 to one or more clerk validation terminals ("CVT's") 124. The CVT's connect to a ticket validation system 118, in one embodiment, through a standard RS-232 connection (not shown in FIG. 2). The ticket validation system 118 has a server computer (not shown), which stores ticket data and information that is accessed from the processor 38 of each gaming device 10. The server computer of the ticket validation system 118 is typically housed inside the casino or gaming establishment and is of a suitable size to run network operating software such as Windows NT, Unix, Linux or Novell NetWare.

In another embodiment, the ticket validation network 116 is an Ethernet network, wherein the processor 38 of the gaming device 10 connects to an Ethernet card (not illustrated) or other suitable network interface card. The network interface card connects to the server computer (not shown) of the validation system 118 via a suitable shielded coaxial copper cable or via a twisted pair wire housed in an RJ-45 connector, which is similar to a conventional phone jack.

In either embodiment, the server or host computer of the ticket validation system 118 can read and identify bar coded information stored on a ticket that a player inserts into the gaming device 10. The server or host computer also has the ability to authorize or reject a ticket that the ticket/receipt printer 106 of gaming device 10 issues to the player.

As illustrated, processor 38 in one embodiment operates with a separate card reader 115. Such a card reader enables the player to receive game credits from the EFT tracking system of the present invention onto a player card or casino card. The card reader 115 enables the player having credits stored on a casino card to insert such card for play, regardless of whether or not the player has obtained the credits from the present EFT invention. The system in one embodiment enables the player to place the credit/debit card in EFT card reader 115 to authorize a credit transfer, then place the player tracking card in the EFT card reader 115 to receive such credits, remove the player tracking card from the EFT reader and then place the credited player card into card reader 115 associated with game processor 38 for play. Or, the player can insert the player card in card reader 115 associated with game processor 38, receive a fund transfer via the networks of the present invention and commence gaming without removing the casino card from card reader 115 associated with processor 38.

Figure 3:
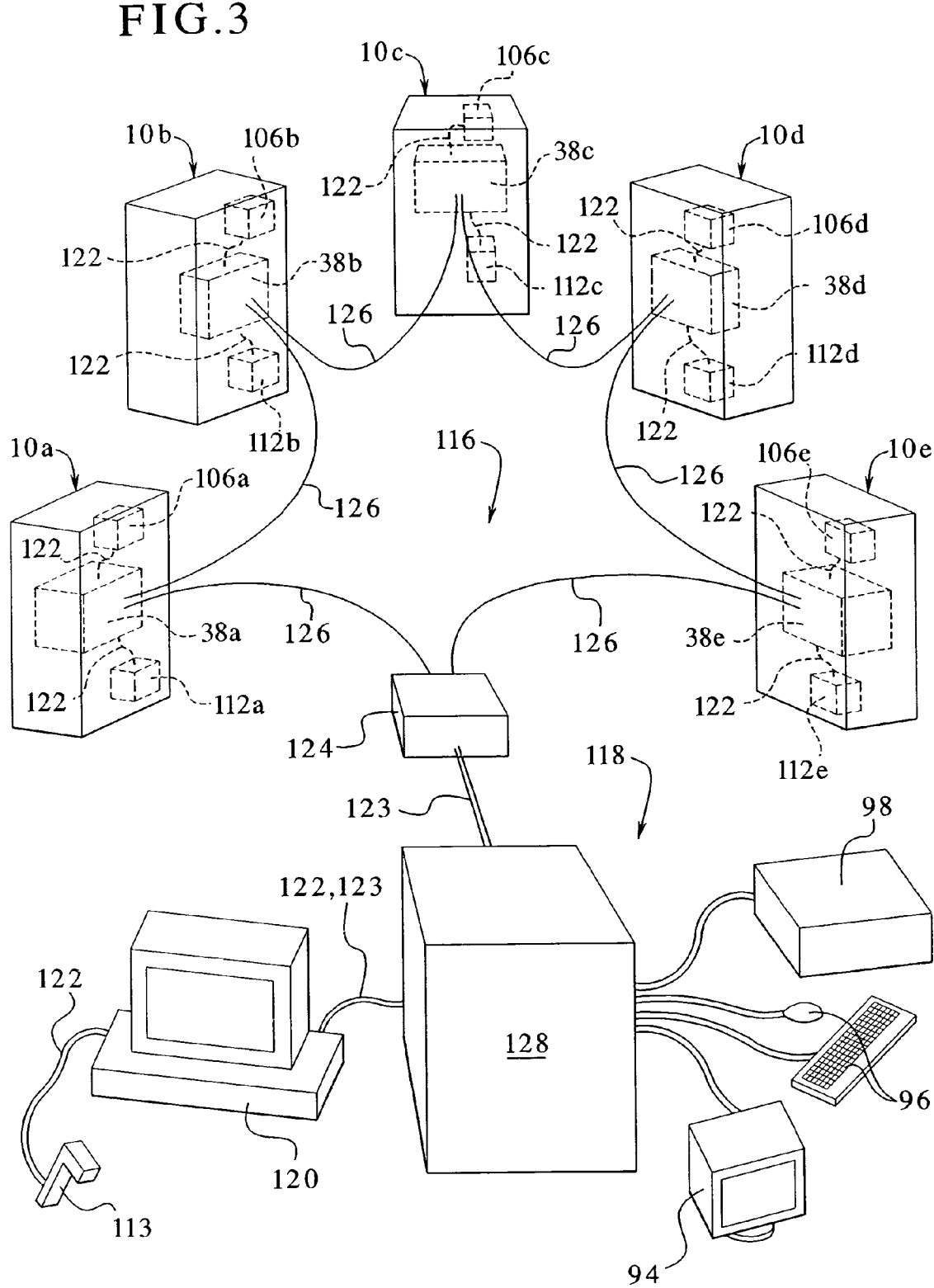
FIG. 3 is a perspective view of one embodiment of the ticket validation network of the present invention.

Referring now to FIG. 3, one embodiment of the validation network 116 is illustrated communicating with a plurality of gaming devices 10a through 10e and the ticket validation system 118. It should be appreciated that the network is preferably adapted to serve any number of gaming devices and is not limited to the five illustrated in the schematic diagram of FIG. 3. Gaming devices 10a through 10e are in communication with the ticket validation system 118, via the ticket validation network 116. The ticket validation system 118, communicates with one or more operator computers or PC's 120, wherein the PC's 120 communicate via an RS-485 connection 122 with a hand-held reader 113. The operator station needs the sophistication of the ticket readers, similar to ticket readers 112 contained within each gaming device 10a through 10e. In one embodiment the operator uses a hand-held scanner or a hand-held wand reader, collectively referred to as the hand-held reader 113. The operator uses the hand-held reader 113 to redeem a player's ticket for an amount of money. As illustrated, each of the ticket printers 106a through 106e and the ticket readers 112a through 112e communicate respectively with the processors 38a through 38e via a RS-485 connection 122. The ticket validation network 116, the gaming devices 10a through 10e, the ticket validation system 118 and the operator PC 120 are preferably housed inside and maintained by a casino or other type of gaming establishment.

As indicated above, in one embodiment, the ticket validation network 116 is a fiber-optic network. The fiber-optic network 116 includes inlet and outlet fiber-optic lines 126 to and from the processor 38a to 38e of each gaming device 10a to 10e. The inlet and outlet fiber-optic lines 126 serially link the gaming devices to one or more CVT's 124. The apparatus and method of operating a ticketing system employing a fiber-optic network linking multiple gaming devices to one or more CVT's 124 is well known to those of skill in the art.

In one embodiment, the CVT 124 connects to the host computer 128 of the ticket validation system 118 by an RS-232 link. In one embodiment, the host computer 128, in turn connects to the operator PC 120 via an RS-232 link 122 or an RS-485 link 123.

In an alternative embodiment, the ticket validation network is an Ethernet network. Here, the gaming devices 10a through 10e, the ticket validation system 118 and the one or more operator PC's 120 are attached to the LAN validation network 116 as branches off of an Ethernet bus (not illustrated). Each gaming device 10a through 10e, the operator PC 120 and the ticket validation system 118 have a unique address in the Ethernet embodiment, as is well known in the art.

In the Ethernet embodiment, when it is desired that a gaming device 10a to 10e or an operator PC 120 send ticket verification data to the ticket validation system 118, an Ethernet network interface card (not shown), installed in the gaming device or PC, sends the verification data though a transceiver of the Ethernet along the Ethernet bus to the validation system 118. The ticket validation system recognizes the address of the particular gaming device or PC that has sent the verification data, so that after analyzing the data, the validation system 118 knows where to send the validated ticket or rejected ticket response. The server or host computer 128 of the ticket validation system 118 has suitable RAM and ROM to run the network operating software.

It should be appreciated that the ticket validation network 116 may be adapted to be any network known in the art. Regardless of the type of network, the server or host computer 128 stores ticket validation software that is adapted to receive barcode or other identification information from a ticket 108 sent by the gaming device processor 38, analyze this information and either: (i) provide the appropriate gaming device 10 with an authorization to credit a monetary amount associated with the ticket 108; or (ii) instruct the gaming device 10 to reject the ticket 108. The ticket validation system 118 communicates with the processor 38 of the gaming device 10. As stated above, a number of manufacturers currently produce ticket validation systems. The ticket validation system 118 also receives commands from an external network as described below, which authorize the ticket validation system 118 to credit a ticket 108 in the gaming device 10.

In one embodiment, the ticket validation system 118 also includes a plurality of operator interface devices such as a computer monitor 94, a keyboard and mouse 96 and a printer 98. The server or host computer 128 in one embodiment has the capability to store and log ticketing data, such as failed ticketing attempts over a given period, the total number of ticketing transactions per period, the total monetary amount of the ticketing transactions per period, ticketing transactions sorted by debit card and ticketing transactions sorted by credit card, etc. The computer monitor 94 enables the operator to view the ticketing data. The keyboard and mouse 96 enable the operator to manipulate and tabulate the ticketing data. The printer 98 enables the operator to print reports concerning the ticketing data.

The ticket validation system 118 is adaptable in one embodiment to link with other ticket validation systems at related, (e.g., commonly owned or operated), casinos or gaming establishments. The linked system is commonly referred to as a wide area network or WAN. The WAN links separate ticket validation systems from different casinos by phone line, T-1 or T-3 connections, leased phone lines, microwaves or the Internet.

The advantage of the WAN ticketing system for entities owning a number of casinos is to have a single access point to the ticketing data. The WAN is adaptable to include a computer located in an office as opposed to a casino, wherein an accounting analysis of the ticketing data is performed for each casino or other gaming establishment connected to the WAN. The WAN/LAN system is also adaptable to include, for example, a bank of poker machines at a supermarket, convenience store, airport or other remote location. These types of locations can house a server computer that links the individual machines into a LAN, wherein the WAN includes the server computer. Alternatively, the WAN links the individual machines.

Electronic Funds Transfer System

Referring now to FIG. 4, a general electronic configuration of the electronic funds transfer system for the gaming device 10 is illustrated. For reference, the processor 38 described above that communicates with the ticket validation network 116, is illustrated. Processor 38 also communicates with any one, or more, or all of the devices described above in connection with FIG. 2. The system includes an EFT control unit 130 or controller, which has a processor 132 and a memory device 134. As illustrated, the processor 38 does not connect to or communicate directly with the EFT controller 130. As illustrated in FIG. 4, processor 38 of the gaming device 10 indirectly via the various networks 116 and 140 and servers 118, 128, and 144 communicates with a card reader 115, which in one embodiment is housed within the gaming device 10. The card reader 115 obtains information concerning a player's debit, credit, smart or similar banking card account from a magnetic strip or other suitable device attached to the player's debit, credit, smart or similar banking card, respectively. In an alternative embodiment, a hand held device (not shown) mentioned earlier, which includes one or both the keypad 102 and display 104 (see FIG. 1), can also include the card reader 115 and its associated aperture 114. As before, aperture 114 may be adapted for card insertion, card swiping or other communication.

The processor 132 has a microprocessor or microcontroller-based platform. The memory device 134 includes random access memory (RAM) 136 for storing event data or other data generated or used during a ticketing transaction. The memory device 134 also includes read only memory (ROM) 138 for storing program code, which controls the ticketing transaction, e.g., enables the keypad 102 at the appropriate time or displays a proper accept/reject message or a proper set of options on the display 104 at the appropriate time. In one preferred embodiment, the gaming device 10 houses the EFT controller 130 as well as the game processor 38. The present invention may be adapted however, to remotely connect the EFT controller 130 to the card reader 115, keypad 102 and funds transfer display 104.

In one embodiment, the electronic funds transfer is initiated when the player swipes, inserts or passes a credit card or debit card through, or into the aperture 114 of card reader 115 or by another suitable card reader (not shown). The card reader 115 sends a signal to the EFT controller 130, which indicates that the player has inserted the card. The EFT controller 130 recalls an appropriate message and directs the vacuum florescent display 104 to display the message to the player. In one embodiment, the initial message directs the player to choose a credit or debit transaction.

When the player presses a button 103 of the keypad 102, a contact preferably momentarily closes so that a small amount of electrical current flows through the contact to the processor's I/O, which signals an input to the processor 132. When the player selects a debit or credit button on the numerical keypad 102, a contact closure enables the processor to receive an appropriate input. The present invention preferably enables the player to charge money against a cash advance limit on the player's credit card or withdraw money directly from the player's bank account. It should be appreciated that the EFT controller 130 may be adapted to prompt the player to choose credit versus debit at a time during the electronic fund withdrawal. For instance, the EFT controller 130 can prompt the choice after the player enters their personal identification number (PIN).

The EFT controller 130 also recalls a suitable message that prompts the player to enter their PIN using the multi-button numerical keypad 102. When the player keys in the PIN, the EFT controller 130 receives the PIN in an encrypted form. Once the player completely enters the PIN into the EFT controller 130 and selects an enter button, the EFT controller 130 recalls an appropriate message and directs the vacuum florescent display 104 to display the message to the player, which requests the player to enter a monetary withdrawal amount.

To enter an amount, the player again uses the multi-button numerical keypad 102, whereby the player presses buttons 103 to enter an amount and then presses the enter button. It should be appreciated that at any time up to this point, the player can cancel the electronic funds transfer by selecting a cancel button. Pressing the enter button enters the amount into the EFT controller 130. Alternatively, the funds transfer display 104 may be adapted to display a number of predetermined amount selections to the player such as a fast cash amount or multiples of ten, twenty, fifty, one hundred and two hundred dollars in a conventional manner.

The funds transfer display 104 and the EFT controller 130 are also adaptable to enable the player to request certain bank account information such as an amount of available money or a listing of the player's most recent transactions.

The connections for one or more of the keypad 102, display 104 and card reader 115 may be extended and run in a flexible cable along with appropriate shielding to a hand held unit (not shown), which is connectable to and extends from the gaming device 10. The unit may be adapted to perform any of the functions discussed in connection with FIG. 4.

Once the EFT controller 130 has accumulated the player's account number, encrypted PIN number and fund transfer amount, the EFT controller 130 sends this information via an EFT network 140, to a cashless gateway server 144, through a banking network 142 and to a remote fund repository 146. The EFT network 140 links the EFT control units 130 of the gaming devices of one casino or gaming establishment, which are configured for an electronic funds transfer, through a cashless gateway server 144 to the banking network 142. In one embodiment, the cashless gateway server 144 connects to or links to the server or host computer 128 of the ticket validation system 118 via a conventional connection, such as an Ethernet connection.

Figure 5:
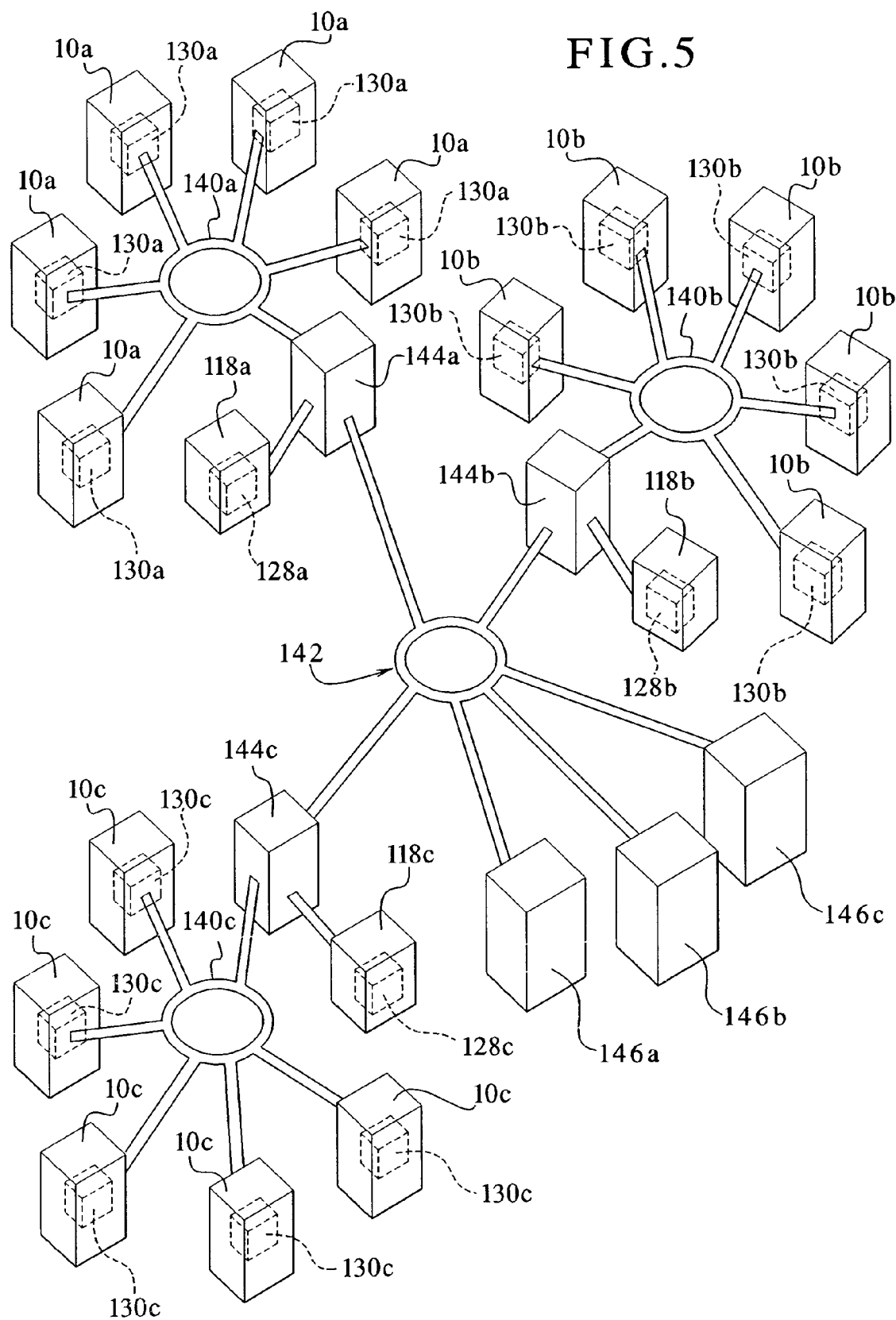
FIG. 5 is a perspective view of one embodiment of the banking network of the present invention.

Referring now to FIG. 5, one embodiment of the banking network 142 of the present invention is illustrated, wherein a plurality of EFT networks 140a through 140c communicate with the banking network 142 through cashless gateway servers 144a through 144c, respectively. The banking network 142 links various cashless gateway servers 144a through 144c to various remote fund repositories 146a through 146c. It should be appreciated that the EFT networks 140a through 140c are adaptable to serve any number of gaming devices. Further, the banking network 142 is adaptable to link any number of cashless gateway servers, such as servers 144a through 144c. The banking network 142 is also adaptable to link any number of remote fund repositories, such as 146a to 146c, and is not limited to three as illustrated.

In FIG. 5, each EFT network 140a through 140c links the gaming devices of a separate casino or gaming establishment. The EFT network 140a communicates with the EFT control units 130a of the gaming devices 10a and the cashless gateway server 144a for a first gaming establishment. Similarly, the EFT network 140b communicates with the EFT control units 130b of the gaming devices 10b and the cashless gateway server 144b for a second gaming establishment. Likewise, the EFT network 140c communicates with the EFT control units 130c of the gaming devices 10c and the cashless gateway server 144c for a third gaming establishment. In a one embodiment, the cashless gateway servers 144a to 144c connect respectively to the server computers 128a to 128c of the respective ticket validation systems 118a to 118c via a suitable linkage, such as an Ethernet connection well known to those of skill in the art.

In each gaming establishment, the server computer 128a to 128c of the respective ticket validation system 118a to 118c links each of the gaming device processors 38 (not shown) as described above. Each gaming establishment communicates with a cashless gateway server 144a to 144c, through the banking network 142, to the remote fund repositories 146a to 146c. The conventional, e.g., Ethernet connection between each of the cashless gateway servers and its respective ticket validation system is thus the connecting point between the EFT control units 130 of the gaming devices 10 and the processors 38 of the gaming devices 10. While the EFT controller 130 and the processor 38 are preferably physically housed in the same gaming device 10 in this embodiment, the two devices do not directly communicate.

In one embodiment, the gaming establishments do not house the cashless gateway servers 144a through 144c, wherein the EFT networks 140a though 140c are WAN's. Here, the EFT networks 140a through 140c link the gaming devices to the cashless gateway servers 144a through 144c via T-1 or T-3 connections, leased phone lines, microwaves or the Internet. To maintain the security and privacy of the electronic funds transfer, the connection is preferably a separate leased phone line or a high speed T1 or T3 phone line.

Alternatively, the EFT networks 140a through 140c are linked via the Internet using encryption software such as Windows' Virtual Private Network software. This software uses heavy encryption to maintain privacy among Internet connected server computers, such as the cashless gateway servers 144a through 144c. The software enables the server computers to operate as if they are directly connected. The cashless gateway servers 144a through 144c are adaptable to have a plurality of EFT network clients 140a through 140c.

The banking network 142 in an embodiment links the cashless gateway servers 144a through 144c to the remote fund repositories 146a through 146c via separate leased phone lines or high speed T1 or T3 phone lines and alternatively through the Internet. FIG. 5 illustrates the banking network 142 as a single network hub or bus having a spoke that connects to each of the cashless gateway servers 144a through 144c and each of the remote fund repositories 146a through 146c. Thus each server 144a to 144c can access a plurality of repositories 146a to 146c. The banking network 142 is adaptable to have a plurality of such hubs, and the remote fund repositories 146a through 146c are each adaptable to link to a plurality of banking networks 142.

The cashless gateway servers 144a through 144c are in one embodiment known mainframe computers that route electronic funds transfer requests from retail or service outlets such as a supermarket, department store or casino, to the remote fund repositories 146a through 146c, which are banks, credit unions and the like. The cashless gateway servers 144a through 144c may be provided by companies such as Cirrus™, Interlink™ and Global Cash Access™. The cashless gateway servers 144a through 144c contain switching software that routes the fund transfer request to the appropriate remote fund repository 146a, 146b or 146c. The remote fund repositories analyze the request and send an approval or rejection response back to the appropriate electronic fund server as further described below. The remote fund repositories are adaptable to recall and send other information such as account balances, available balances and recent transaction information.

Some larger casinos or other gaming establishments and some entities owning a number of casinos or other gaming establishments may wish to house and maintain their own cashless gateway server, such as the servers 144a through 144c. In a large casino or large gaming establishment that houses its own cashless gateway server, the EFT network, such as 140a through 140c, is in one embodiment a LAN having the network operating cards or Ethernet link as described above, whereby the cashless gateway servers 144a to 144c communicate with the repositories 146a to 146c over the banking network 142. Entities owning or servicing a number of casinos or other gaming establishments may have the cashless gateway server located in an office as opposed to a casino or gaming establishment, wherein a WAN links the server to various casinos or gaming establishments and to the fund repositories. In any of the embodiments herein disclosed, one or more or all of the cashless gateway servers 144a through 144c and repositories 146a through 146c may be adapted to include one or more operator interface devices such as a monitor 94, keyboard/mouse 96 and printer 98 shown in FIG. 3.

In one embodiment, one or both the EFT network 140 and the banking network 142 are adaptable to reside on the Internet using suitable encryption software. In one Internet implementation, the cashless gateway server 144a to 144c also provides Internet access for each of the EFT control units 130a to 130c of the gaming devices 10. In another implementation, a separate Internet server (not illustrated) is employed. The Internet game/server configuration is preferably performed over a LAN, which constitutes the EFT network 140a to 140c, wherein the cashless gateway server 144a to 144c is directly connected to the Internet. The direct Internet connection gives the EFT control units 130a to 130c of the gaming devices access to the Internet, e.g., via an Ethernet network.

In the embodiment where one or both of the EFT network 140a to 140c and the banking network 142 reside on the Internet, the cashless gateway server 144a to 144c includes Windows-based computers, Macintoshes and/or other hardware that run a suitable operating system. The EFT control units 130a to 130c send files containing the player's account, PIN and amount request information to the cashless gateway server 144a to 144c, which passes the request over the Internet through a Common Gateway Interface ("CGI"), i.e., the banking network 142, to a dedicated database server at the appropriate remote fund repository 146a to 146c. The remote fund repository 146a to 146c performs a database search to analyze and allow or deny the player's fund request. The dedicated database server of the remote fund repository 146a to 146c returns request results over the Internet to the cashless gateway server 144a to 144c, wherein the results are handled as described below.

In the Internet embodiment, the cashless gateway server 144a to 144c includes, if desired, a suitable firewall, which keeps intruders from breaking into the EFT network 140a to 140c, and which keeps track of fund requests, responses and other data passed along the EFT network 140a to 140c. The Internet cashless gateway server 144a to 144c also includes the capability to house or store one or more web sites. The Internet game/server configuration thus provides casinos with the ability to maintain a web site dedicated to providing the switching software necessary to route the player's electronic fund request to the appropriate remote fund repository 146a to 146c. The Internet cashless gateway server 144a to 144c also enables the casino or gaming establishment to obtain, retain and track the number of player requests, the request amounts, the frequency of approvals versus rejections, etc.

Method of Operation

Figure 6:
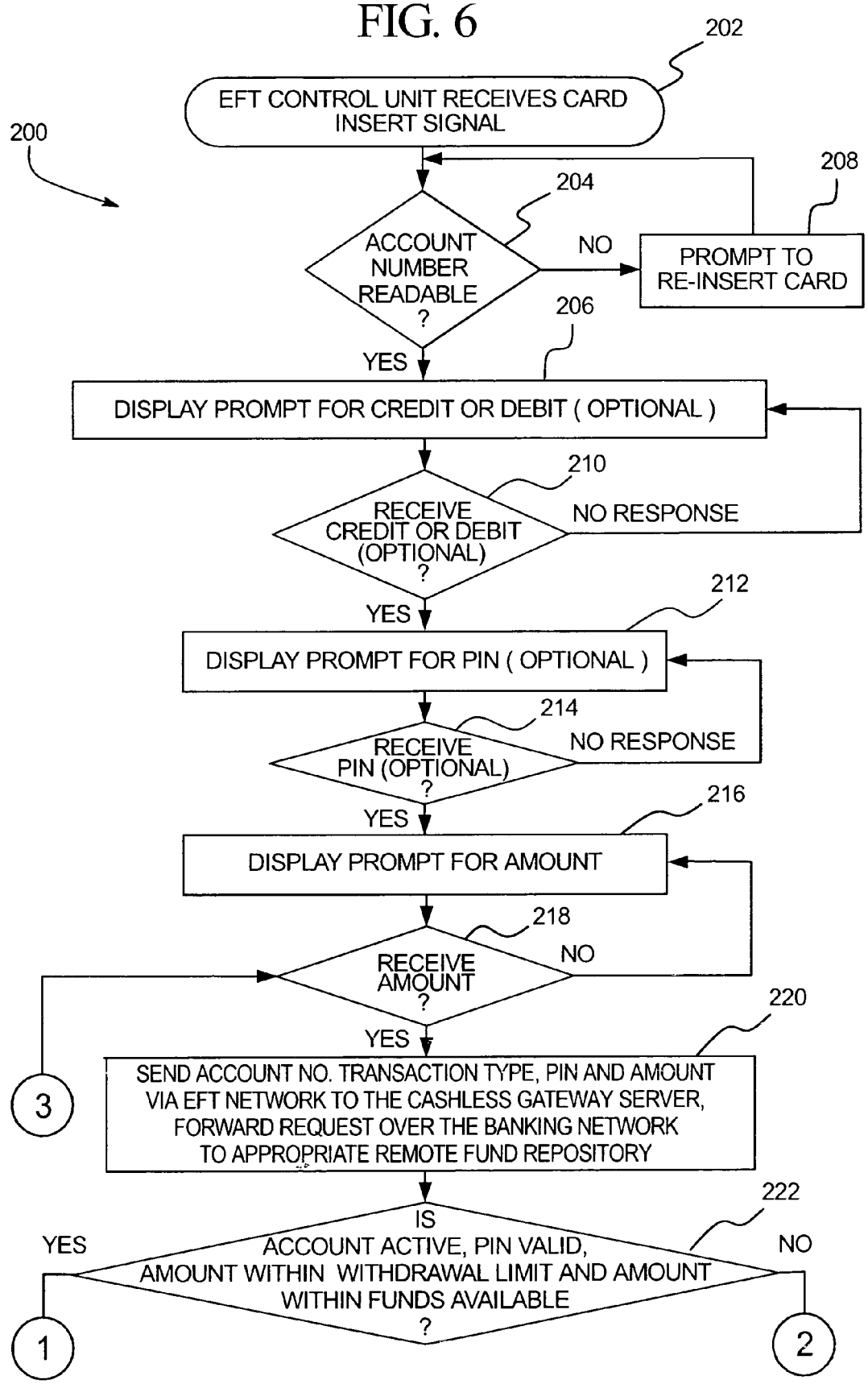
FIG. 6 is a block diagram of a fund query process of one sequence of the electronic funds transfer system of the present invention.

Referring now to FIGS. 1, 2, 4 and 6 through 8, one sequence of operation for the present invention is schematically illustrated. FIG. 6 illustrates a fund query portion 200 of the sequence of operation. When the player swipes, inserts or passes a credit or debit card into or by the card reader 115 of the EFT controller 130, as indicated by the oval 202, the EFT controller 130 receives a signal indicating that the player wishes to electronically access funds. If the card reader 115 can read the magnetic strip of the card, as indicated by diamond 204, the EFT controller 130 optionally causes the funds transfer display 104 to prompt the player to choose a credit or debit transaction, as indicated by block 206.

If the card reader 115 cannot read the magnetic strip of the card, the EFT controller 130 causes the funds transfer display 104 to prompt the player to re-swipe or re-insert the card, as indicated by block 208. Although not illustrated, this sequence may be adapted to enable the player to magnetically insert the card's account number a predetermined number of times. After the predetermined number of attempts, the sequence is adaptable to either terminate the transaction or enable the player to key in the card's account number via the buttons 103 of keypad 102.

After optionally prompting the player to choose a credit or debit transaction, the EFT controller 130 awaits a selection, as indicated by diamond 210. When the player makes a credit versus debit selection, the EFT controller 130 optionally causes the funds transfer display 104 to prompt the player to enter a PIN number, as indicated by block 212. A PIN number is usually required for a debit transaction and may or may not be required for a credit card transaction. It should be appreciated that this process is adaptable to meet the banking requirements of any type of electronic funds transfer card.

After optionally prompting the player to enter a PIN number, the EFT controller 130 awaits a PIN number entry, as indicated by diamond 214. When the player enters the PIN number via the keypad 102, the EFT controller 130 causes the funds transfer display 104 to prompt the player to enter a withdrawal amount, as indicated by block 216. The player also enters the withdrawal amount via the keypad 102.

After prompting the player to enter a transaction amount, the EFT controller 130 awaits an amount entry, as indicated by diamond 218. When the player enters the withdrawal amount via the keypad 102, the EFT controller 130, as indicated by block 220, sends a fund request that includes: (i) the account number; (ii) the transaction type; (iii) the PIN number if required; and (iv) the amount. The EFT controller 130 sends the fund request onto the EFT network 140 to the cashless gateway server 144, which forwards the request to the banking network 142, whereby the appropriate remote fund repository 146 receives the request, as indicated by block 220.

Upon receiving the request, the remote fund repository 146 analyzes the request in accordance with the appropriate banking procedures. The exact procedures are not material to the present invention as claimed and may require that additional information be entered by the player or read from the card's magnetic strip. The present sequence may be adapted to provide such additional information. In this embodiment of the fund query portion 200 of FIG. 6, the remote fund repository 146, as indicated by diamond 222, analyzes the fund request to determine if: (i) the account is active; (ii) the card is expired; (iii) the PIN is valid; (iv) the amount is within a withdrawal limit; (v) the player has not requested to be excluded; and (vi) the amount requested is within the funds available. Other criterion might apply as well to the fund request determination process. For instance, the remote fund repository 146 may also check to see whether the card holder is old enough to play the gaming device 10.

Figure 7B:
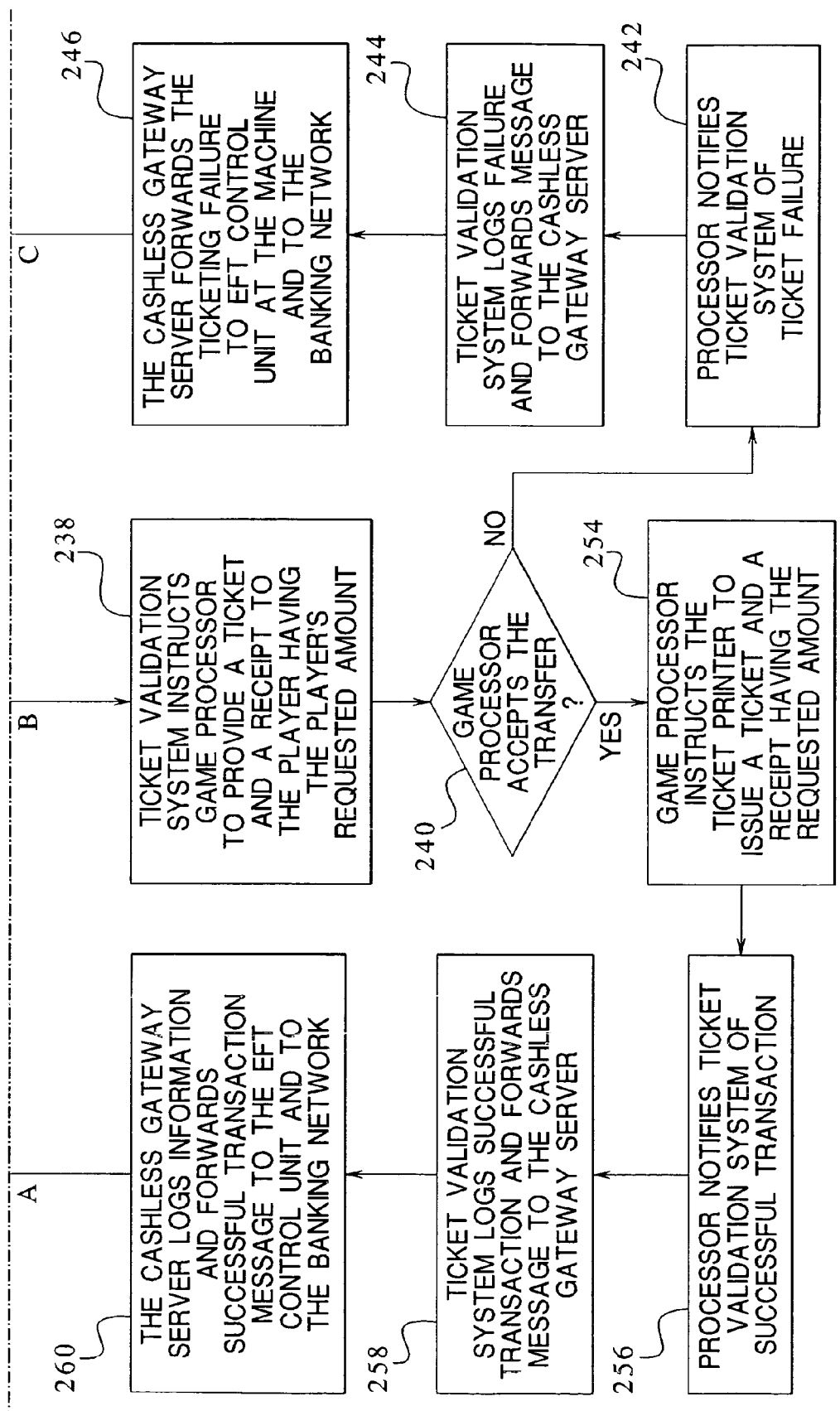
FIG. 7 is a block diagram of a fund request approval process of one sequence of the electronic funds transfer system of the present invention.

If the fund request meets each of the above criteria, a request approved portion 230 of the sequence is commenced, as illustrated in FIG. 7 (7A and 7B). The remote fund repository 146 sends a fund request approval out over the banking network 142 to the cashless gateway server 144. The cashless gateway server 144 forwards the approval to the EFT network 140 as indicated by block 232. As indicated by block 234, the cashless gateway server 144 logs the request approval along with appropriate request identification information (i.e., data managed by financial intermediary such as Cirrus™, Interlink™ or Global Cash Access).

The cashless gateway server 144 forwards the request approval, gaming device address and request amount to the ticket validation system 118, as indicated by block 236. The ticket validation system 118 instructs the appropriate game processor 38 to provide a ticket 108 and a receipt bearing the requested amount to the player, as indicated by block 238. The game processor 38 either accepts or rejects the request approval from the ticket validation system 118, as indicated by diamond 240. The processor may reject an approved request because the ticket/receipt printer 106 is malfunctioning, because the printer is out of paper or for other reasons, such as when the machine is not configured to receive a transfer.

If the game processor 38 rejects the approved request, the processor 38 notifies the ticket validation system 118 of the ticketing failure and alternatively a cause of the failure, as indicated by block 242. The ticket validation system 118 logs the ticketing failure and optionally the failure's cause into the ticket validation server 128 and forwards the failure message to the cashless gateway server 144, as indicated by block 244. The cashless gateway server 144 forwards the ticketing failure message to the EFT controller 130 of the gaming device 10 and to the banking network 142, as indicated by block 246.

The EFT controller 130 displays a ticketing failure message to the player on the funds transfer display 104, as indicated by block 248. Over the banking network 142, the appropriate remote fund repository 146 receives the ticketing failure message and cancels the fund transfer, as indicated by block 250. The electronic funds transfer sequence ends, as indicated by oval 252.

If the game processor 38 accepts the approved request, as indicated by diamond 240, the processor 38 in one embodiment instructs the ticket/receipt printer 106 to issue a ticket 108 and a receipt 109 bearing the requested amount as indicated by block 254. In one preferred embodiment, the ticket printer 106 places a barcode on the ticket 108. The processor 38 notifies the ticket validation system 118 of the successful fund transaction, as indicated by block 256. The ticket validation system 118 logs the successful fund transaction and forwards the message to the cashless gateway server 144, as indicated by block 258. The cashless gateway server 144 logs the successful fund transaction message and forwards the successful fund transaction message to the EFT controller 130 of the gaming device 10 and to the banking network 142, as indicated by block 260.

Over the banking network 142, the appropriate remote fund repository 146 receives the successful fund transaction message and clears the fund transfer, as indicated by block 262. The EFT controller 130 prompts the player to retrieve the credited ticket 108 and the receipt 109 from the ticket/receipt printer 106 and queries whether the player desires to view account information, as indicated by block 264. If the EFT controller 130 receives an account information request, as indicated by diamond 266, the control unit displays the requested account information on the funds transfer display 104, as indicated by block 268. Otherwise, and in any case after the display of the account information, the electronic funds transfer sequence ends, as indicated by oval 252.

Figure 8:
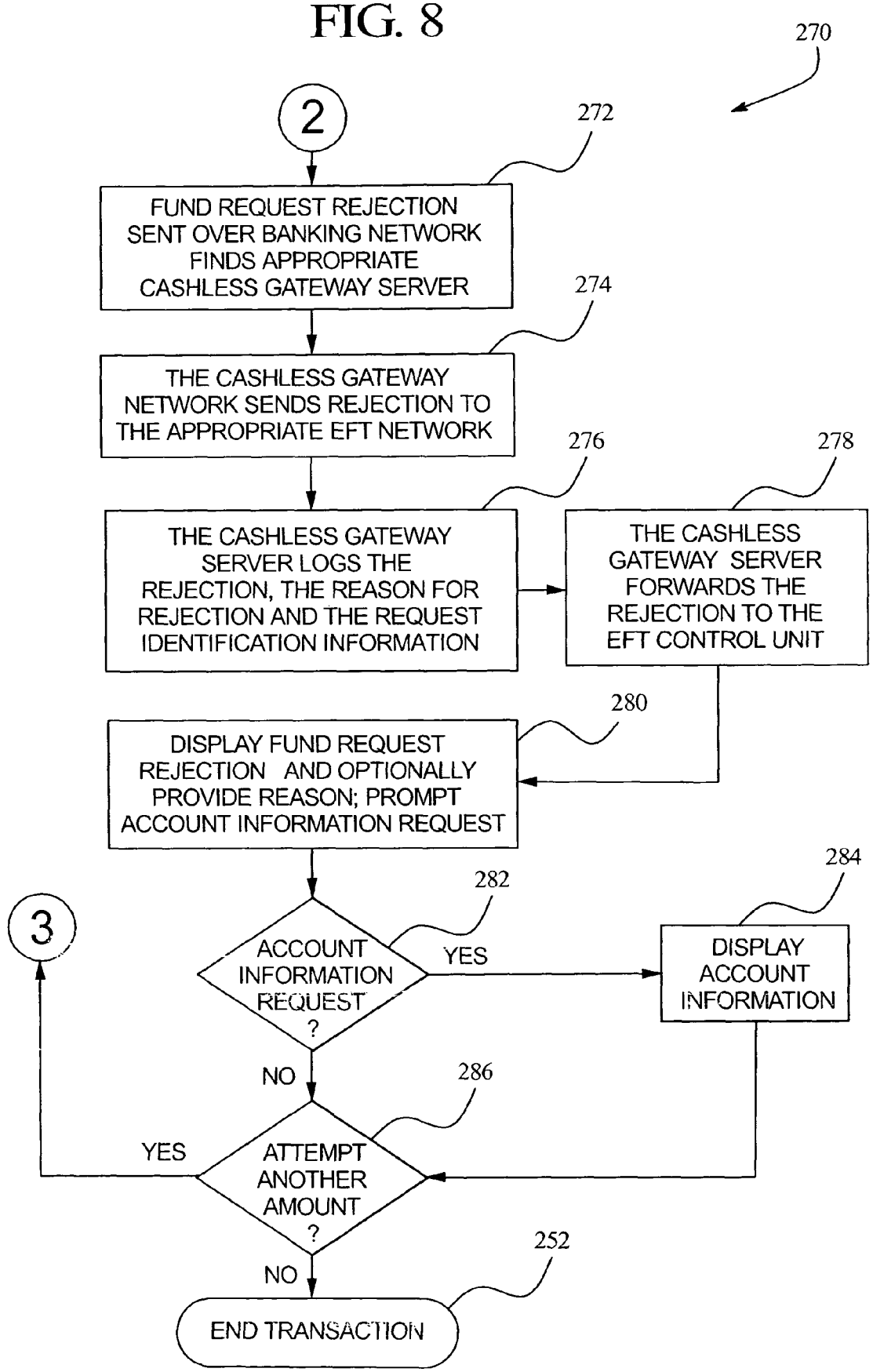
FIG. 8 is a block diagram of a fund request rejection process of one sequence of the electronic funds transfer system of the present invention.

If the fund request does not meet each of the above criteria indicated in diamond 222 of FIG. 6, a request denied portion 270 of the sequence is commenced, as illustrated in FIG. 8. The remote fund repository 146 sends a fund request rejection out over the banking network 142 to the appropriate cashless gateway server 144, as indicated by block 272. The cashless gateway server sends the rejection to the appropriate EFT network 140, as indicated by block 274. As indicated by block 276, the cashless gateway server 144 logs the fund request rejection, the reason for the rejection and appropriate request identification information. Then, the cashless gateway server 144 will forward to the ticket validation system 118 the request rejection and the appropriate request identification information.

The cashless gateway server 140 then forwards the request rejection, the reason for the rejection and the gaming device address to the EFT controller 130, as indicated by block 278. The EFT controller 130 causes the funds transfer display 104 to inform the player of the fund request rejection and optionally the reason therefore and causes the display to query whether the player wishes to see account information, as indicated by block 280.

If the EFT controller 130 receives an account information request, as indicated by diamond 282, the EFT controller 130 displays the requested account information on the funds transfer display 104, as indicated by block 284. Otherwise, and in any case after the display of the account information, the EFT controller 130 queries whether the player wishes to attempt another electronic fund request using a lesser amount, as indicated by diamond 286. If the player wishes to attempt another electronic fund request using a lesser amount, the EFT controller 130 awaits the entry of another amount, as indicated by diamond 218 of FIG. 6. Otherwise, the electronic funds transfer sequence ends, as indicated by oval 252.

In one alternative embodiment of the present invention, the receipt is provided to the player in the form of a receipt or statement delivered to the player at a cashier or other location in the casino or through other means such as sent to the player via facsimile, electronic mail, regular mail, or other suitable delivery systems. Additionally, multiple transactions could be recorded on the statement. Accordingly, the present invention contemplates remote delivery of the receipt or a statement or receipt to the player for verification.

From the foregoing discussion of the method of the present invention, it should be appreciated that when the player or user obtains or requests an electronic funds transfer using a gaming device employing the present invention, the funds transferred are not in one embodiment converted into credits on the gaming machine. Rather, the player obtains a ticket representing the fund transfer having the requested amount. The player can then redeem this ticket for money or use the ticket in any gaming device having a ticket reader, whereby the gaming device redeems the ticket for game credits. This provides an opportunity for the player to confirm the amount of the fund transfer. The present invention further provides a receipt to the player or user for the electronic funds transfer or the denial of the requested electronic funds transfer. Alternatively, as discussed above, the transfer is paid to the player in any combination of coins, tokens, cash and an accrediting of the player's casino card.

Alternative Embodiment

Figure 9:
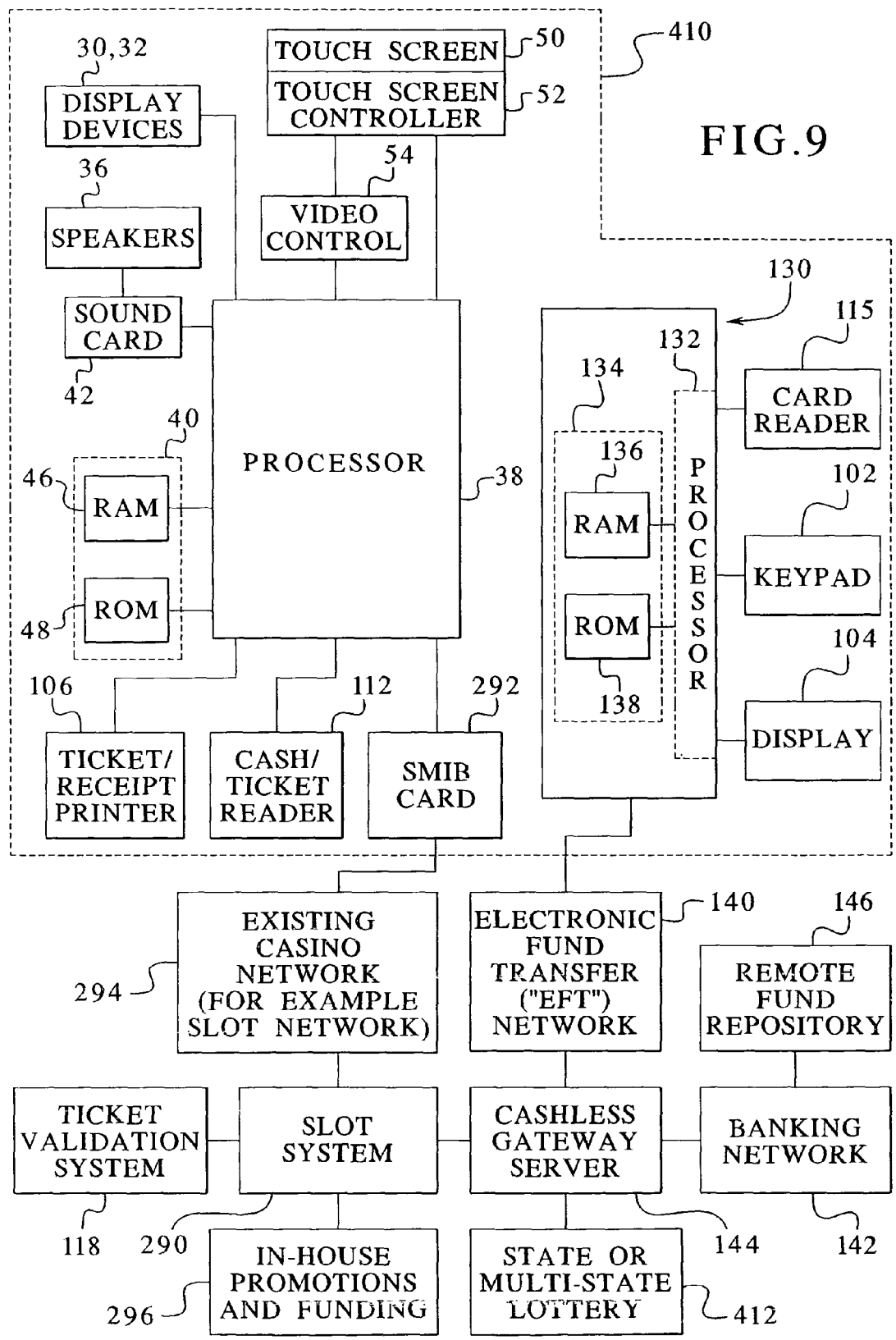
FIG. 9 is a schematic block diagram of the electronic configuration for an alternative embodiment of the gaming device, wherein an approved fund transfer is not required to pass through the ticket validation system to be issued to a player.
Figure 10:
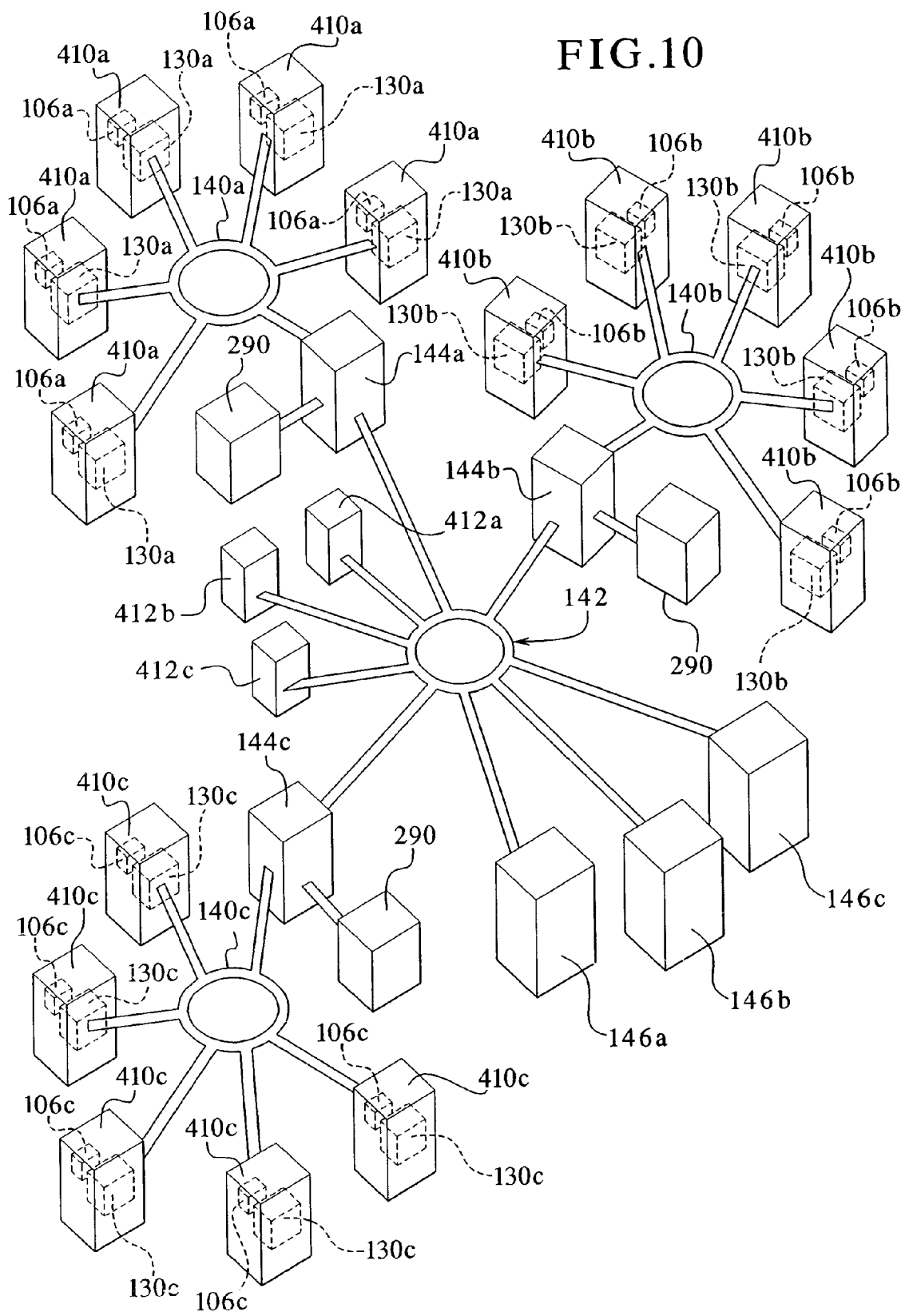
FIG. 10 is a perspective view of one embodiment of the banking network that enables the electronic fund transfer control units located inside the gaming devices to access fund repositories as well as state lotteries.

Referring now to FIGS. 9 and 10, one alternative embodiment of the present invention is illustrated. The alternative embodiment is similar in many respects to the embodiments described above, except that an alternative gaming device 410 receives a fund transfer (e.g., in the form of a ticket), wherein the cash approved fund transfer does not pass first through the ticket validation system 118 and network 116. Gaming device 410 in one preferred embodiment provides the fund transfer in the form of a ticket 108 as described above, as well as a receipt 109 from printer 106 via apertures 110/111 to the player. The receipt includes information such as the amount transferred, the account number, the date, the time, available amount as well as any other pertinent information.

Alternative gaming device 410 again includes EFT controller 130 that is stored inside of the cabinet of gaming device 410 or is placed adjacent to gaming device 410 in EFT box 117 as described above. EFT box 117 or the panel of gaming device 410 include the keypad 102 and buttons 103, the funds transfer display 104, the card reader 115 and associated aperture 114 and a ticket/receipt printer 106 defining apertures 110/111. Gaming device 410 also includes one or more display devices 30 or 32 for displaying and playing a game associated with gaming device 410 which can be slot, poker, keno, blackjack, craps and any other known video game and any combination of these. Gaming device 410 looks the same from the outside as gaming device 10 as seen in FIG. 1.

Referring now to FIG. 9, an electrical schematic of the alternative gaming device 410 is illustrated. The alternative gaming device 410, like the gaming device 10 described above, includes two processors, processor 38 and processor 132, the latter of which forms part of the EFT controller 130. Processor 38 communicates with the cash/ticket reader/validator 112, the speakers 36 through sound card 42, the display devices 30 or 32 and with a memory device 40 having RAM 46 and ROM 48. Either one of the display devices 30 or 32 can be associated or operate with a touchscreen 50 through a touchscreen controller 52 and a video controller 54. Processor 38 also operates with a ticket/receipt printer 106.

The EFT controller 130 includes the processor 132, which communicates with memory device 134 having RAM 136 and ROM 138. Processor 132 of controller 130 communicates electrically with card reader 115, keypad 102 and display 104. Controller 130 also communicates via the EFT network 140 to a cashless gateway server 144, which operates via a wide area banking network 142 with a remote fund repository 146 and/or a state or multi-state lottery 142.

Gaming device 410 differs from gaming device 10 because it includes a slot machine interface board or "SMIB" 292. Gaming device 10 can also include a SMIB 292, wherein SMIB 292 does not operate with the system of the present invention. SMIB's 292 were installed into gaming machines at least by the assignee of the present invention in the early 1990's. SMIB's 292 allowed the casinos to perform player tracking, to offer promotions and to remotely fund machines.

As seen in FIG. 9, the SMIB 292 located inside gaming device 410 operates with an existing slot system 290. Slot system 290 operates with a currently existing computer network 294 located inside the casino which runs the player tracking, promotions and in-house cashless funding programs 296 for these casino. In one embodiment, the slot system 290 communicates with the ticket validation system 118 as illustrated.

The alternative system of FIGS. 9 and 10 uses the existing slot system 290 to communicate with the cashless gateway server 144. That is, a processed fund request is not communicated to processor 38 through the ticket validation system/server 118/128 and the ticket validation network 116 as seen in FIG. 4. Instead, the cashless gateway server 144 communicates with the slot system 290, which in turn communicates through a currently existing casino network 294 with the processor 38 (e.g., via SMIB 292).

Slot system 290 also notifies the ticket validation system 118 (which can also operate independent of the systems and networks of the present invention) of the processed fund request so that the ticketing system 118 accounts for the fund transfer. In that way, the system 118 honors the player's ticket 108 should the player decide to redeem the ticket 108 instead of inserting same back into the gaming device 410 via ticket reader/validator 112. As described below, the present invention contemplates funding the player with credits and/or coins or tokens instead of or in addition to providing the player a ticket 108. If credits, coins or tokens are provided instead of a ticket 108, the fund transfer does not need to be communicated to the ticket validation system 118. Slot system 290 handles all the accounting functions in such a case.

Referring now to FIG. 10, a plurality of banks of alternative gaming devices 410a, 410b and 410c are illustrated. Each of those gaming devices includes a corresponding controller 130a to 130c and a ticket/receipt printer 106a to 106c. As illustrated in FIG. 9, the ticket/receipt printer 106 communicates with game processor 38. Alternatively in FIG. 10, the receipt printers 106a to 106c communicate respectively and individually with the control units 130a to 130c. The gaming devices 410a to 410c link respectively to associated cashless gateway servers 144a to 144c via the EFT networks 140a to 140c. EFT networks 140a to 140c can be local or wide area networks as described above.

Cashless gateway servers 144a to 144c communicate electrically and in any combination with remote fund repositories 146a to 146c via a wide area network 142. Wide area network 142 in an embodiment includes an internet. FIG. 10 differs from FIG. 5 in that the cashless gateway servers do not communicate with the ticket validation networks 116. Instead, servers 144a to 144c communicate with respective slot systems 290a to 290c (referred to collectively as slot systems 290). Slot systems 290 alternatively communicate with validation systems 118 depending upon whether gaming devices 410 (collectively 410a to 410c) issue tickets or not. Because gaming devices 410a to 410c may not issue a ticket to the player, the ticket validation system network may not be needed. In one preferred embodiment, however, gaming device 410 provides a ticket printer in combination with the receipt printer, wherein the player can receive funds either on a ticket only or additionally in the coin payout tray or on the credit meter.

The gaming devices 410a to 410c link in any combination to a plurality of remote fund repositories 146a to 146c via the banking network 142. The cashless gateway servers 144a to 144c also, as illustrated, can link in any combination via the banking network to one or more state or multi-state lotteries 412a to 412c. The lotteries can be confined to a single state or span multiple states. The lotteries can be in the form of a Powerball™-type lottery or a Keno-type lottery or be any other type of known lottery. The lottery ticket can be a scratch-type ticket or show a plurality of numbers, some of which are selected by the player, which are compared to numbers pulled in a draw performed later in time. The lottery ticket can have any value, for example a multiple of a game credit, although values of fractions of a credit are also possible. The player can wager any desired amount on one or more lottery tickets, limited by the funds available at the appropriate remote fund repository 146a to 146c.

To provide the lottery ticket to the player, the ticket/receipt printer 106 is modified to provide the lottery ticket. Alternatively, a printer separate from ticket/receipt printer 106 is provided, which is dedicated to providing lottery tickets. The lottery ticket printer can be configured to operate with game processor 38 or controller 130 of gaming device 410.

In any of the foregoing embodiments of FIGS. 1 to 10, the funds are alternatively transferred to gaming device 10/410 in the form of an amount of credits credited to a credit display 16. Still further, gaming device 10/410 can pay the transferred cash amount in the form of coins or tokens to the coin payout tray 28 via a hopper placed inside gaming device 10/410. In still another embodiment, a printer such as receipt printer 106 is converted to issue a lottery ticket to the player.

The gaming device is configured in yet a further alternative embodiment to provide a selection menu to the player that allows the player to receive cash directly in one or more of the above described forms. For example, if the player requests and receives one hundred dollars from a remote fund repository, sixty dollars can be paid in the form of credits on the credit display 16, another thirty credits can be paid to the player in the coin payout tray 28, and another ten credits can be paid out to the player in the form of lottery tickets.

These alternative embodiments may eliminate certain equipment or procedures. For example, the ticket/receipt printer 106 may only print a receipt if gaming device 10 pays only in credits, coins or tokens. Or, if gaming device 10/410 does not print or receive a ticket, the device does not need a printer, validation respectively.

To receive funds in the above-described one or more alternative forms, the player swipes or inserts a credit card, debit card, casino card or smart card into aperture 114 of card reader 115. The player enters a requested amount and/or a PIN via keypad 102 and keys 103 and sees EFT information displayed on display 104. EFT information, as above, includes the amount, PIN, type of account accessed as well as any other appropriate, desirable information. Display 104 or alternatively displays 30 and 32 display fund request approvals or denials, depending upon whether the remote fund repository authorizes the transfer of the requested amount of funds.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device configured to operate to request and receive funds electronically, said gaming device comprising:
   a game processor configured to operate to receive a wager from a player to initiate a wagering game;
   an EFT controller configured to operate to process an electronic fund transfer request by the player, the EFT controller configured to operate without direct communication between the game processor and the EFT controller;
   a card reader configured to operate with the EFT controller;
   a payment device configured to operate with the game processor to provide a monetary amount to a player after;
   (i) a card of the player is read by the card reader,
   (ii) the EFT controller receives an approval for the electronic fund transfer request from a remote fund repository via a banking network and without said approval being communicated from the EFT controller to the game processor,
   (iii) the EFT controller sends data indicative of the approval to a gaming establishment network external to the gaming device, and
   (iv) the game processor receives the data indicative of the approval from the gaming establishment network; and
   a housing that supports the EFT controller, the game processor, the card reader, and the payment device.

2. The gaming device of claim 1, wherein the card is selected from the group consisting of: a credit card, a debit card, a gaming establishment card, and any combination thereof.

3. The gaming device of claim 1, wherein the amount is of a type selected from the group consisting of: a ticket, one or more gaming device credits, one or more gaming device tokens, one or more coins, a lottery ticket, and any combination thereof.

4. The gaming device of claim 1, wherein the payment device is one selected from the group consisting of: a ticket printer, a hopper, a credit meter, a gaming establishment card/account, a lottery ticket issuer, and any combination thereof.

5. The gaming device of claim 1, which includes a first display configured to operate with the EFT controller to display electronic fund transfer information to the user.

6. The gaming device of claim 5, which includes an additional second display configured to display the wagering game of the gaming device.

7. The gaming device of claim 1, which includes an input device operable with the EFT controller to enable the user to input electronic fund transfer information.

8. The gaming device of claim 1, wherein the banking network includes a wide area network.

9. The gaming device of claim 1, wherein the banking network includes an internet.

10. The gaming device of claim 1, wherein the gaming establishment network includes a local casino network that interfaces the banking network with the game processor.

11. The gaming device of claim 10, wherein the local casino network supports at least one function selected from the group consisting of: a promotions function, one or more casino-player fund transfers, a player tracking function, and any combination thereof.

12. The gaming device of claim 10, wherein the local casino network communicates with a ticket validation system that logs the monetary amount provided to the player.

13. The gaming device of claim 10, which includes an integrated circuit board configured to provide an interface between the game processor and the local casino network.

14. A gaming device configured to operate to transfer funds electronically for use by a player, said gaming device comprising:
   a housing;
   a first processor supported by the housing and configured to operate to:
      (a) receive an electronic fund transfer request from the player, the request including at least an account number and a requested amount of money,
      (b) send the request to a remote fund repository that generates a response to the request, said response to the request indicative of whether the remote fund repository approved the request,
      (c) receive the response to the request, and
      (d) cause data indicative of the response to be sent to a gaming establishment network external to the gaming device;
   a ticket printer supported by the housing; and
   a second processor supported by the housing and configured to cause the ticket printer to print a ticket indicative of the requested amount in response to receiving a signal from the gaming establishment network if the response to the request is indicative that the remote fund repository approved the request, the second processor thus configured to operate without direct communication between the first processor and the second processor and without said response to the request being communicated from the first processor to the second processor.

15. The gaming device of claim 14, wherein the electronic fund transfer request includes at least one selected from the group consisting of: a personal identification number and an election for a transfer from a credit account or a debit account.

16. A system for transferring funds electronically to a gaming device for use by a player, said system comprising:

a gaming device having a EFT control unit and a game processor;

a first network configured to operate to access a remote fund repository, the remote fund repository configured to receive an electronic fund transfer request from the EFT control unit of the gaming device and to provide, to the EFT control unit, a response to the electronic fund transfer request; and a second network external to the gaming device, the second network configured to communicate with the EFT control unit and the game processor to:
 (i) receive first data indicative of the response from the EFT control unit, and
 (ii) if the response includes an approval, send second data indicative of a monetary amount to credit the player to the game processor, such that the gaming device is configured to operate via the second network without direct communication between the EFT control unit and the game processor and without said response being communicated from the EFT control unit to the game processor.

17. The system of claim 16, wherein the first network includes an internet.

18. The system of claim 16, which includes a plurality of remote fund repositories linked to one another and to the gaming device via the first network.

19. The system of claim 16, which includes a plurality of gaming devices linked by the second network.

20. The system of claim 19, wherein at least two of the plurality of gaming devices enable a player to wager on at least two different types of games.

21. The system of claim 16, wherein the second network includes a gaming establishment network implemented as a local area network.

22. The system of claim 16, which includes a ticket printer configured to print a ticket indicating the monetary amount.

23. The system of claim 22, wherein the ticket printer is located in the gaming device.

24. A method of providing a monetary amount for use at a gaming device in a gaming establishment, said method comprising:
 transmitting, from a first processor of the gaming device, a fund request amount to a remote fund repository;
 receiving, at a second processor of the gaming device, a response originating from the remote fund repository, said response sent:
  (i) from the remote fund repository to the first processor,
  (ii) from the first processor to an external network of the gaming establishment, and
  (iii) from the external network to the second processor and without said response being communicated from the first processor to the second processor, the response indicating whether the remote fund repository approved the request;
 providing the amount for use at the gaming device if the response indicates that the remote fund repository approved the request; and
 informing the gaming establishment of the amount provided for use at the gaming device.

25. The method of claim 24, wherein providing the amount for use at the gaming device includes at least one selected from the group consisting of: crediting a credit meter of the gaming device, issuing a number of tokens from a hopper, issuing a lottery ticket, and printing a receipt.

26. The method of claim 24, wherein transmitting the fund request includes transmitting the fund request amount from the first processor over a wide area network.

27. The method of claim 24, which includes receiving the response at the second processor over a local area network.

* * * * *

UNITED STATES PATENT AND TRADEMARK OFFICE
CERTIFICATE OF CORRECTION

| | | |
|---|---|---|
| PATENT NO. | : 7,819,742 B2 | Page 1 of 1 |
| APPLICATION NO. | : 10/662618 | |
| DATED | : October 26, 2010 | |
| INVENTOR(S) | : Chamberlain et al. | |

It is certified that error appears in the above-identified patent and that said Letters Patent is hereby corrected as shown below:

IN THE CLAIMS:

In Claim 1, Column 23, line 44, replace "after;" with -- after: --.

Signed and Sealed this
Fourth Day of January, 2011

David J. Kappos
*Director of the United States Patent and Trademark Office*